United States Patent
Endo et al.

(10) Patent No.: US 9,633,782 B2
(45) Date of Patent: Apr. 25, 2017

(54) WIRELESS POWER TRANSMITTER

(71) Applicant: ADVANTEST CORPORATION, Tokyo (JP)

(72) Inventors: Yuki Endo, Tokyo (JP); Yasuo Furukawa, Tokyo (JP)

(73) Assignee: ADVANTEST CORPORATION, Tokyo (JP)

( * ) Notice: Subject to any disclaimer, the term of this patent is extended or adjusted under 35 U.S.C. 154(b) by 622 days.

(21) Appl. No.: 14/093,241

(22) Filed: Nov. 29, 2013

(65) Prior Publication Data

US 2014/0091637 A1 Apr. 3, 2014

Related U.S. Application Data

(63) Continuation of application No. PCT/JP2012/003190, filed on May 16, 2012.

(30) Foreign Application Priority Data

Jun. 2, 2011 (JP) .................................. 2011-124443
Jun. 8, 2011 (JP) .................................. 2011-128661

(51) Int. Cl.
*H01F 38/14* (2006.01)
*H02J 5/00* (2016.01)
(Continued)

(52) U.S. Cl.
CPC ............. *H01F 38/14* (2013.01); *H02J 5/005* (2013.01); *H02J 17/00* (2013.01); *H02J 50/10* (2016.02);
(Continued)

(58) Field of Classification Search
CPC .. B60L 5/005; B60L 11/1809; B60L 11/1811; B60L 11/1812; B60L 11/1816;
(Continued)

(56) References Cited

U.S. PATENT DOCUMENTS 4,953,068 A 8/1990 Henze
5,619,078 A 4/1997 Boys et al.
(Continued)

FOREIGN PATENT DOCUMENTS

JP 08-501435 2/1996
JP 11-155245 6/1999
(Continued)

OTHER PUBLICATIONS

Taiwanese Office Action corresponding to Application No. 101119046; Dispatch date: Jul. 21, 2015, with English translation.
(Continued)

*Primary Examiner* — Levi Gannon
(74) *Attorney, Agent, or Firm* — Cantor Colburn LLP

(57) ABSTRACT

An automatic tuning assist circuit is coupled with a transmission antenna. Multiple switches SW and a first auxiliary capacitor CA are arranged between a first terminal and a second terminal of the automatic tuning assist circuit. A first control unit is configured to switch on and off the multiple switches SW in synchronization with a driving voltage $V_{DRV}$. A power supply is configured to apply the driving voltage $V_{DRV}$ across a series circuit that comprises the transmission antenna and the automatic tuning assist circuit.

14 Claims, 28 Drawing Sheets

(51) Int. Cl.
*H04B 5/00* (2006.01)
*H02J 50/10* (2016.01)
*H02J 50/12* (2016.01)
*H02J 17/00* (2006.01)

(52) U.S. Cl.
CPC ............ *H02J 50/12* (2016.02); *H04B 5/0037* (2013.01); *H04B 5/0075* (2013.01)

(58) Field of Classification Search
CPC   B60L 11/182; B60L 11/1829; B60L 11/1831; H01F 38/14; H02J 5/00; H02J 5/005; H02J 7/025; H02J 17/00; H02J 50/00; H02J 50/10; H02J 50/12; H04B 5/0037; H04B 5/0075; H04B 5/0081; H04B 5/0087; Y02T 10/7072; Y02T 90/10; Y02T 90/122
USPC ........................................................ 307/104
See application file for complete search history.

(56) References Cited

U.S. PATENT DOCUMENTS

| | | | |
|---|---|---|---|
| 5,898,579 A | 4/1999 | Boys et al. | |
| 6,064,398 A | 5/2000 | Ellenby et al. | |
| 6,160,374 A * | 12/2000 | Hayes | H02J 7/025 320/108 |
| 6,301,128 B1 * | 10/2001 | Jang | H02J 5/005 363/127 |
| 7,301,536 B2 | 11/2007 | Ellenby et al. | |
| 7,876,072 B2 | 1/2011 | Weber et al. | |
| 7,898,113 B2 | 3/2011 | Shimada et al. | |
| 8,212,415 B2 | 7/2012 | Komjima | |
| 9,030,843 B1 | 5/2015 | Herbert | |
| 2008/0068400 A1 | 3/2008 | John et al. | |
| 2008/0297107 A1 * | 12/2008 | Kato | H01F 27/2871 320/108 |
| 2010/0225173 A1 * | 9/2010 | Aoyama | H02M 3/337 307/104 |
| 2010/0259955 A1 | 10/2010 | Shimada | |
| 2011/0049997 A1 | 3/2011 | Urano | |
| 2011/0080054 A1 * | 4/2011 | Urano | H02J 5/005 307/104 |
| 2011/0095619 A1 * | 4/2011 | Urano | H02J 5/005 307/104 |
| 2011/0241439 A1 * | 10/2011 | Urano | H02M 7/53803 307/104 |
| 2011/0285350 A1 | 11/2011 | Mitsutani | |
| 2012/0009869 A1 * | 1/2012 | Suzuki | H04B 5/0037 455/41.1 |
| 2012/0112543 A1 | 5/2012 | Van Wageningen et al. | |
| 2012/0127765 A1 * | 5/2012 | Maruyama | H02J 5/005 363/126 |
| 2012/0235500 A1 * | 9/2012 | Ganem | H03H 7/40 307/104 |
| 2013/0069424 A1 | 3/2013 | Kajouke et al. | |
| 2013/0069582 A1 * | 3/2013 | Kimoto | H02M 3/33592 320/101 |
| 2013/0193917 A1 | 8/2013 | Sugiyama | |
| 2013/0314038 A1 * | 11/2013 | Kardolus | B60L 11/1812 320/109 |

FOREIGN PATENT DOCUMENTS

| | | |
|---|---|---|
| JP | 2004-072832 | 3/2004 |
| JP | 2006-296098 | 10/2006 |
| JP | 2007-252049 | 9/2007 |
| JP | 2008-104295 | 5/2008 |
| JP | 2011-044036 | 3/2011 |
| JP | 2011-050140 | 3/2011 |
| JP | 2011-083132 | 4/2011 |
| JP | 2011-083178 | 4/2011 |
| JP | 2011-091991 | 5/2011 |
| JP | 2011-101575 | 5/2011 |
| JP | 2011-239655 | 11/2011 |
| TW | 201108693 A1 | 3/2011 |
| TW | 201112628 A1 | 4/2011 |

OTHER PUBLICATIONS

Karalis, et al. "Efficient wireless non-radiative mid-range energy transfer." Annals of Physics 323 (2008) p. 34-48.

IPRP and ISR for related PCT/JP2012/003191 issued on Dec. 2, 2013 and mailed on Jun. 19, 2012 and its English translation.

IPRP and ISR for related PCT/JP2012/003190 issued on Dec. 2, 2013 and mailed on Aug. 7, 2012 and its English translation.

Office Action for Japanese Patent Application No. 2013-517842 dated Mar. 17, 2015 and its English translation.

Office Action for Japanese Patent Application No. 2013-517843 dated Feb. 3, 2015 and its English translation.

U.S. Non-Final Rejection for U.S. Appl. No. 14/092,813 dated May 23, 2016.

* cited by examiner

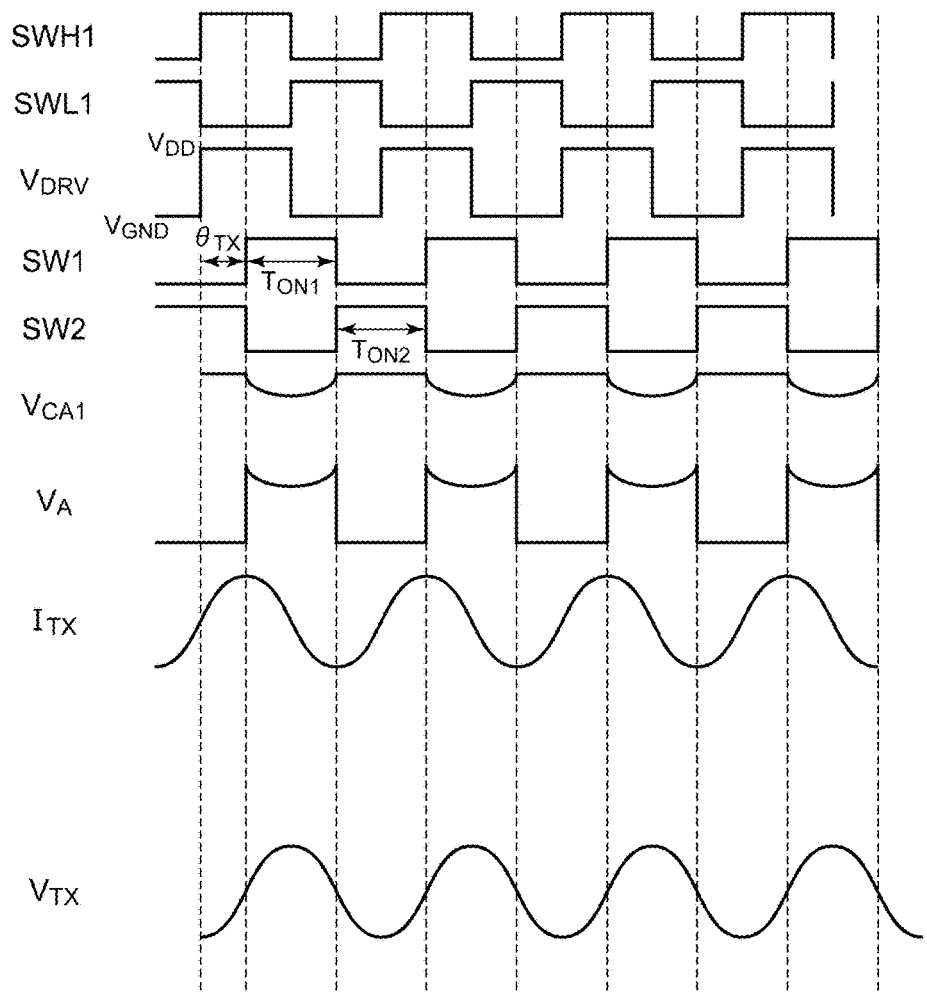

2

2d

2e

4a

4b

4d

4e

WIRELESS POWER TRANSMITTER

CROSS-REFERENCE TO RELATED APPLICATIONS

This application is a continuation of International Patent Application No. PCT/JP2012/003190, filed on May 16, 2012, which claims priority to Japanese Patent Application No. 2011-124443 filed on Jun. 2, 2011, and Japanese Patent Application 2011-128661 filed on Jun. 8, 2011, the disclosures of which are hereby expressly incorporated by reference into the present application in their entireties.

BACKGROUND OF THE INVENTION

1. Field of the Invention

The present invention relates to a wireless power supply technique.

2. Description of the Related Art

In recent years, wireless (contactless) power transmission has been receiving attention as a power supply technique for electronic devices such as cellular phone terminals, laptop computers, etc., or for electric vehicles. Wireless power transmission can be classified into three principal methods using an electromagnetic induction, an electromagnetic wave reception, and an electric field/magnetic field resonance.

The electromagnetic induction method is employed to supply electric power at a short range (several cm or less), which enables electric power of several hundred watts to be transmitted in a band that is equal to or lower than several hundred kHz. The power use efficiency thereof is on the order of 60% to 98%. In a case in which electric power is to be supplied over a relatively long range of several meters or more, the electromagnetic wave reception method is employed. The electromagnetic wave reception method allows electric power of several watts or less to be transmitted in a band between medium waves and microwaves. However, the power use efficiency thereof is small. The electric field/magnetic field resonance method has been receiving attention as a method for supplying electric power with relatively high efficiency at a middle range on the order of several meters (A. Karalis, J. D. Joannopoulos, M. Soljacic, "Efficient wireless non-radiative mid-range energy transfer" ANNALS of PHYSICS Vol. 323, January 2008, pp. 34-48)

FIG. 1 is a diagram showing a wireless power transmission system according to a comparison technique. The wireless power transmission system $1r$ includes a wireless power transmitting apparatus $2r$ and a wireless power receiving apparatus $4r$. The wireless power transmitting apparatus $2r$ includes a transmission coil $L_{TX}$, a resonance capacitor $C_{TX}$, and an AC power supply $10r$. The wireless power receiving apparatus $4r$ includes a reception coil $L_{RX}$, a resonance capacitor $C_{RX}$, and a load $70$.

The resonance frequency is an important factor in magnetic field (electric field) resonance power transmission. The resonance frequency of the transmitter side LC resonance circuit is represented by $f_{TX}=1/(2\pi\sqrt{(L_{TX} \cdot C_{TX})})$. The resonance frequency of the receiver side LC resonance circuit is represented by $f_{RX}=1/(2\pi\sqrt{(L_{RX} \cdot C_{RX})})$. Thus, in order to provide high-efficiency electric power transmission, there is a need to appropriately adjust the transmitter-side and receiver-side resonance frequencies and the frequency of the AC power supply $10r$. However, in actuality, such resonance frequencies fluctuate depending on various kinds of factors. It is difficult for the power receiving apparatus side to tune the fluctuating resonance frequency based on the magnetic field (or electric field) itself as it has been transmitted from the power supply apparatus. This is because, in some cases, the resonance frequency detected by the power receiving apparatus side further changes depending on the resonance frequency and the phase conditions of the power receiving apparatus side.

SUMMARY OF THE INVENTION

The present invention has been made in order to solve such a problem. Accordingly, it is an exemplary purpose of an embodiment of the present invention to provide a wireless power transmitting apparatus, a wireless power receiving apparatus, and a wireless power supply system, which are capable of automatically tuning the resonance frequency.

An embodiment of the present invention relates to a wireless power transmitting apparatus configured to transmit an electric power signal comprising any one from among an electric field, a magnetic field, and an electromagnetic field to a wireless power receiving apparatus. The wireless power transmitting apparatus comprises: a transmission antenna comprising a transmission coil; an automatic tuning assist circuit coupled with the transmission antenna; and a power supply configured to apply an AC driving voltage across a series circuit that comprises the transmission antenna and the automatic tuning assist circuit. The automatic tuning assist circuit comprises: a first terminal; a second terminal; N (N represents an integer) auxiliary capacitors; multiple switches; and a first control unit. Each of the multiple switches is arranged between two terminals from among the first terminal, the second terminal, and the terminals of the N auxiliary capacitors. The first control unit is configured to switch on and off the multiple switches in synchronization with the driving voltage.

When the frequency of the driving voltage does not match the resonance frequency of the resonance circuit including the transmission antenna, the resonance circuit functions as a capacitor circuit or otherwise an inductor circuit. In this case, in the transmission antenna, a resonance current is induced with a phase that is delayed or otherwise advanced with respect to the phase of the driving voltage. In this state, in a case in which the first switch and the second switch are switched on and off in synchronization with the driving voltage and with a predetermined phase difference with respect to the driving voltage, the first auxiliary capacitor is charged or otherwise discharged so as to provide phase matching between the resonance current and the driving voltage. By applying the correction voltage that develops at the first auxiliary capacitor to the transmission antenna, such an arrangement provides a quasi-resonant state. Such an embodiment is capable of automatically tuning the transmission antenna with respect to the driving voltage even without an operation such as adjusting the capacitance of the resonance capacitor. It should be noted that, in the present specification, the "phase difference" may be set to zero. That is to say, examples of the "phase difference" state include a phase matching state.

Also, the first control unit may be configured to switch on and off each of the multiple switches with the same frequency as that of the driving voltage, or otherwise with a frequency obtained by multiplying or dividing the frequency of the driving voltage by an odd number.

Also, the automatic tuning assist circuit may comprise: a first switch and a first auxiliary capacitor arranged in series between the first terminal and the second terminal; and a second switch arranged between the first terminal and the second terminal such that it is arranged in parallel with the first switch and the first auxiliary capacitor.

Also, the first control unit may be configured to switch on and off the first switch and the second switch with the same frequency as that of the driving voltage, and with a given phase difference with respect to the driving voltage.

Also, the automatic tuning assist circuit may further comprise a second auxiliary capacitor between the first terminal and the second terminal such that it is arranged in series with the second switch.

With such an arrangement, the second auxiliary capacitor is charged or otherwise discharged so as to provide phase matching between the resonance current and the driving voltage, in addition to charging or otherwise discharging the first auxiliary capacitor. Such an arrangement is capable of providing a quasi-resonant state.

The first control unit may be configured to switch on and off the first switch and the second switch with the same frequency as that of the driving voltage, and with a given phase difference with respect to the driving voltage.

Also, the first switch and the second switch may each be configured as a uni-directional switch. Also, the first control unit may be configured to switch on and off the first switch and the second switch with a phase controlled such that no current flows through each of their inversely conducting elements.

Also, the first switch and the second switch may each be configured as a bi-directional switch. Such an arrangement is capable of relaxing the phase constraints on the switching operation.

Also, the automatic tuning assist circuit may be coupled in series with the transmission antenna via a transformer.

With an embodiment, the power supply may comprise: a DC power supply; and a first high-side switch and a first low-side switch sequentially arranged in series between an output terminal of the DC power supply and a fixed voltage terminal. Also, the transmission antenna and the automatic tuning assist circuit may be coupled in series between the fixed voltage terminal and a connection node that connects the first high-side switch and the first low-side switch.

With an embodiment, the power supply may comprise: a DC power supply; a first high-side switch and a first low-side switch sequentially arranged in series between an output terminal of the DC power supply and a fixed voltage terminal; and a second high-side switch and a second low-side switch sequentially arranged in series between the output terminal of the DC power supply and the fixed voltage terminal. Also, the transmission antenna and the automatic tuning assist circuit may be coupled in series between a connection node that connects the first high-side switch and the first low-side switch and a connection node that connects the second high-side switch and the second low-side switch.

Also, the transmission antenna may comprise a resonance capacitor arranged in series with the transmission coil.

Also, the power supply may be configured to apply an AC driving voltage via a transformer between respective terminals of a circuit that comprises the transmission antenna and the automatic tuning assist circuit.

Another embodiment of the present invention relates to a wireless power supply system. The wireless power supply system comprises: a wireless power transmitting apparatus according to any one of the aforementioned embodiments; and a wireless power receiving apparatus configured to receive an electric power signal from the wireless power transmitting apparatus.

Yet another embodiment of the present invention relates to a wireless power receiving apparatus configured to receive an electric power signal comprising any one from among an electric field, a magnetic field, and an electromagnetic field, transmitted from a wireless power transmitting apparatus. The wireless power receiving apparatus comprises: a reception antenna comprising a reception coil; and an automatic tuning assist circuit coupled with the reception antenna. The automatic tuning assist circuit comprises: a first terminal; a second terminal; N (N represents an integer) auxiliary capacitors; multiple switches; and a second control unit. Each of the multiple switches is arranged between two terminals from among the first terminal, the second terminal, and the terminals of the N auxiliary capacitors. The second control unit is configured to switch on and off the multiple switches.

When the frequency of the electric power signal does not match the resonance frequency of the resonance circuit including the reception antenna, the resonance circuit functions as a capacitor circuit or otherwise an inductor circuit. In this case, a resonance current flows through the resonance circuit with a phase that is delayed or otherwise advanced with respect to the phase of resonance voltage that is induced in the resonance circuit. In this state, in a case in which the third switch and the fourth switch are switched on and off with the same frequency as that of the electric power signal, the third auxiliary capacitor is charged or otherwise discharged so as to provide phase matching between the resonance current and the resonance voltage. By applying the correction voltage that develops at the third auxiliary capacitor to the reception antenna, such an arrangement provides a quasi-resonant state. Such an embodiment is capable of automatically tuning the reception antenna with respect to the electric power signal even without an operation such as adjusting the capacitance of the resonance capacitor.

Also, the second control unit may be configured to switch on and off each of the multiple switches with the same frequency as that of the electric power signal, or otherwise with a frequency obtained by multiplying or dividing the frequency of the electric power signal by an odd number.

Also, the automatic tuning assist circuit may comprise: a third switch and a third auxiliary capacitor arranged in series between the first terminal and the second terminal; and a fourth switch arranged between the first terminal and the second terminal such that it is arranged in parallel with the third switch and the third auxiliary capacitor.

Also, the second control unit may be configured to switch on and off the third switch and the fourth switch with the same frequency as that of the electric power signal.

Also, the second control unit may be configured to drive the third switch and the fourth switch with a predetermined phase difference with respect to the driving voltage applied to the transmission antenna of the wireless power transmitting apparatus.

Also, with an embodiment, the automatic tuning assist circuit may further comprise a fourth auxiliary capacitor between the first terminal and the second terminal such that it is arranged in series with the fourth switch.

With such an arrangement, the fourth auxiliary capacitor is charged or otherwise discharged so as to provide phase matching between the resonance current and the driving voltage, in addition to charging or otherwise discharging the third auxiliary capacitor. Such an arrangement is capable of providing a quasi-resonant state.

Also, the third switch and the fourth switch may each be configured as a uni-directional switch. Also, the second control unit may be configured to switch on and off the third switch and the fourth switch with a phase controlled such that no current flows through each of their inversely conducting elements.

Also, the third switch and the fourth switch may each be configured as a bi-directional switch. Such an arrangement is capable of relaxing the phase constraints on the switching operation.

Also, a load to be supplied with electric power may be connected to the third auxiliary capacitor. Also, a load to be supplied with electric power may be connected to a first end of the reception antenna.

Also, the wireless power receiving apparatus according to an embodiment may further comprise a transformer having a primary winding connected in series with the reception antenna. Also, a load to be supplied with electric power may be connected to a secondary winding of the transformer.

Also, the automatic tuning assist circuit may be coupled in series with the reception antenna via a transformer.

Also, the reception antenna may comprise a resonance capacitor arranged in series with the reception coil.

Yet another embodiment of the present invention relates to a wireless power supply system. The wireless power supply system comprises: a wireless power transmitting apparatus configured to transmit an electric power signal comprising any one from among an electric field, a magnetic field, and an electromagnetic field; and a wireless power receiving apparatus according to any one of the aforementioned embodiments, configured to receive the electric power signal.

Yet another embodiment of the present invention relates to an automatic tuning assist circuit employed in a wireless power transmitting apparatus, and coupled with the transmission coil. The automatic tuning assist circuit comprises: at least one auxiliary capacitor; multiple switches arranged in order to charge and discharge the respective aforementioned at least one auxiliary capacitor using a resonance current that flows through the transmission coil; and a first control unit configured to switch on and off the multiple switches so as to generate a capacitor voltage across the respective aforementioned at least one auxiliary capacitor, and to apply, to the transmission coil, a correction voltage that corresponds to the capacitor voltage that develops at the aforementioned at least one auxiliary capacitor.

By providing such an automatic tuning assist circuit, such an arrangement provides a quasi-resonant state. Thus, such an arrangement is capable of automatically tuning the transmission antenna with respect to the driving voltage even without an operation such as adjusting the capacitance of the resonance capacitor.

Yet another embodiment of the present invention relates to an automatic tuning assist circuit employed in a wireless power receiving apparatus, and coupled with the reception coil. The automatic tuning assist circuit comprises: at least one auxiliary capacitor; multiple switches arranged in order to charge and discharge the respective aforementioned at least one auxiliary capacitor using a resonance current that flows through the reception coil; and a second control unit configured to switch on and off the multiple switches so as to generate a capacitor voltage across the respective aforementioned at least one auxiliary capacitor, and to apply, to the reception coil, a correction voltage that corresponds to the capacitor voltage that develops at the aforementioned at least one auxiliary capacitor.

By providing such an automatic tuning assist circuit, such an arrangement provides a quasi-resonant state. Thus, such an arrangement is capable of automatically tuning the reception antenna with respect to the electric power signal even without an operation such as adjusting the capacitance of the resonance capacitor.

It is to be noted that any arbitrary combination or rearrangement of the above-described structural components and so forth is effective as and encompassed by the present embodiments.

Moreover, this summary of the invention does not necessarily describe all necessary features so that the invention may also be a sub-combination of these described features.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIG. 4 is a waveform diagram showing the operation of the wireless power transmitting apparatus shown in FIG. 2;

DETAILED DESCRIPTION OF THE INVENTION

The invention will now be described based on preferred embodiments which do not intend to limit the scope of the present invention but exemplify the invention. All of the features and the combinations thereof described in the embodiment are not necessarily essential to the invention.

In the present specification, the state represented by the phrase "the member A is connected to the member B" includes a state in which the member A is indirectly connected to the member B via another member that does not substantially affect the electric connection therebetween, or that does not damage the functions or effects of the connection therebetween, in addition to a state in which the member A is physically and directly connected to the member B.

Similarly, the state represented by the phrase "the member C is provided between the member A and the member B" includes a state in which the member A is indirectly connected to the member C, or the member B is indirectly connected to the member C via another member that does not substantially affect the electric connection therebetween, or that does not damage the functions or effects of the connection therebetween, in addition to a state in which the member A is directly connected to the member C, or the member B is directly connected to the member C.

[First Embodiment]
[Wireless Power Transmitting Apparatus]

Figure 1:
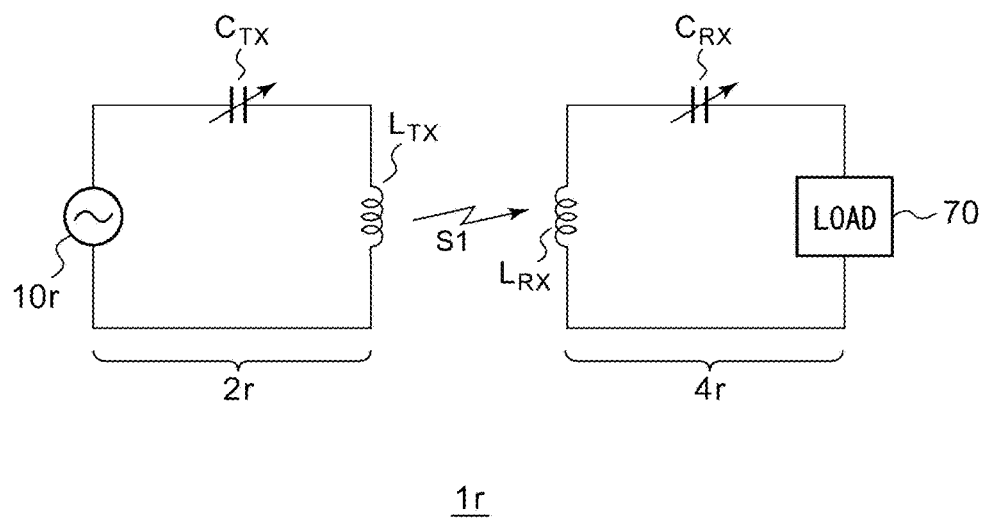
FIG. 1 is a diagram showing a wireless power transmission system according to a comparison technique.
Figure 2:
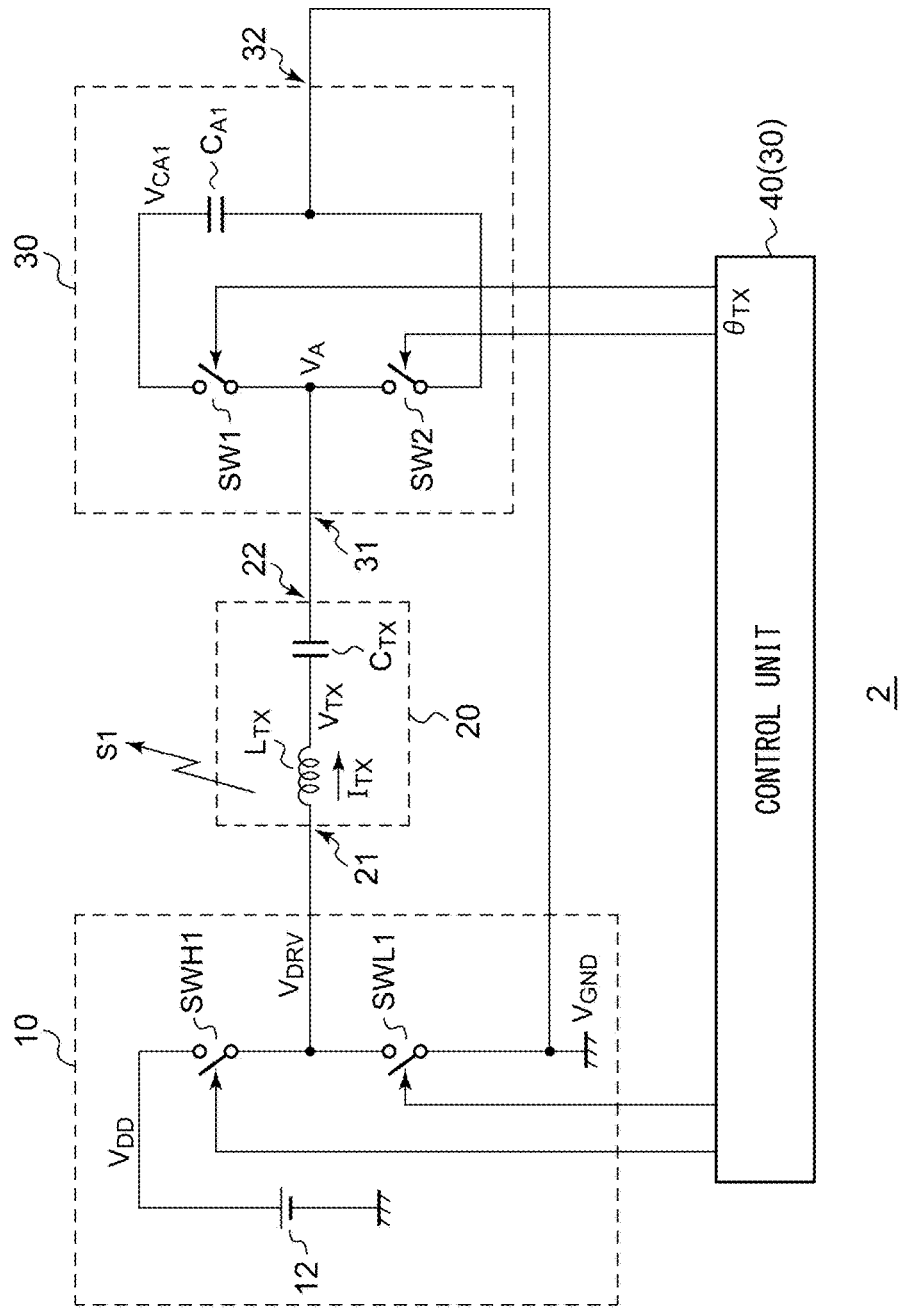
FIG. 2 is a circuit diagram showing a configuration of a wireless power transmitting apparatus according to a first embodiment.

FIG. 2 is a circuit diagram showing a configuration of a wireless power transmitting apparatus 2 according to a first embodiment. The wireless power transmitting apparatus 2 is configured to transmit an electric power signal S1 to a wireless power receiving apparatus (not shown). As such an electric power signal S1, the wireless power transmitting apparatus 2 uses the near-field components (electric field, magnetic field, or electromagnetic field) of electromagnetic waves that have not yet become radio waves.

The wireless power transmitting apparatus 2 includes a power supply 10, a transmission antenna 20, an automatic tuning assist circuit 30, and a first control unit 40.

The transmission antenna 20 includes a transmission coil $L_{TX}$ arranged between its first terminal 21 and its second terminal 22. A resonance capacitor $C_{TX}$ is arranged in series with the transmission coil $L_{TX}$. The resonance capacitor $C_{TX}$ and the transmission coil $L_{TX}$ may also be mutually exchanged.

The automatic tuning assist circuit 30 is coupled in series with the transmission antenna 20. The power supply 10 is configured to apply an AC driving voltage $V_{DRV}$ having a predetermined transmission frequency $f_{TX}$ between the respective terminals of a circuit comprising the transmission antenna 20 and the automatic tuning assist circuit 30. The driving voltage $V_{DRV}$ may be configured to have a desired AC waveform, examples of which include a rectangular waveform, a trapezoidal waveform, a sine waveform, and the like. With the present embodiment, the driving voltage $V_{DRV}$ is configured as a rectangular wave signal which swings between a first voltage level (power supply voltage $V_{DD}$) and a second voltage level (ground voltage $V_{GND}=0$ V).

The power supply 10 includes a DC power supply 12, a first high-side switch SWH1, and a first low-side switch SWL1. The DC power supply 12 is configured to generate a DC power supply voltage $V_{DD}$. The first high-side switch SWH1 and the first low-side switch SWL1 are sequentially connected in series between the output terminal of the DC power supply 12 and a fixed voltage terminal (ground terminal). The first control unit 40 is configured to switch on and off the first high-side switch SWH1 and the first low-side switch SWL1 in a complementary manner, with a transmission frequency $f_{TX}$.

The automatic tuning assist circuit 30 includes a first terminal 31, a second terminal 32, a first switch SW1, a second switch SW2, and a first auxiliary capacitor $C_{A1}$.

The first switch SW1 and the first auxiliary capacitor $C_{A1}$ are arranged in series between the first terminal 31 and the second terminal 32. The first switch SW1 and the first auxiliary capacitor $C_{A1}$ may also be mutually exchanged. The second switch SW2 is arranged in parallel with the first switch SW1 and the first auxiliary capacitor $C_{A1}$ between the first terminal 31 and the second terminal 32. The first auxiliary capacitor $C_{A1}$ is preferably configured to have a sufficiently greater capacitance than that of the resonance capacitor $C_{TX}$.

The first control unit 40 is configured to switch on and off the first switch SW1 and the second switch SW2 in a complementary manner, with the same frequency $f_{TX}$ as that of the driving voltage $V_{DRV}$, and with a predetermined phase difference $\theta_{TX}$ with respect to the driving voltage $V_{DRV}$. The phase difference $\theta_{TX}$ may preferably be set to a value in the vicinity of +90 degrees or otherwise −90 degrees (270 degrees). That is to say, a part of the first control unit 40 functions as a component of the automatic tuning assist circuit 30.

Figure 3A:
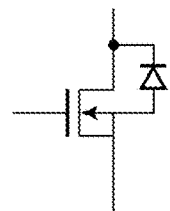
FIGS. 3A through 3F are diagrams each showing an example configuration of a switch employing MOSFETs.
Figure 3B:
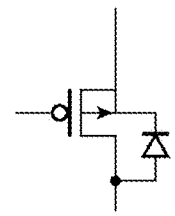
Figure 3C:
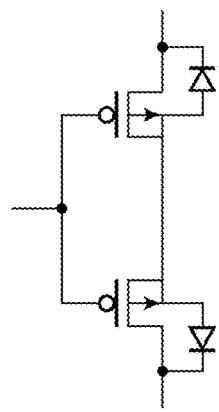
Figure 3D:
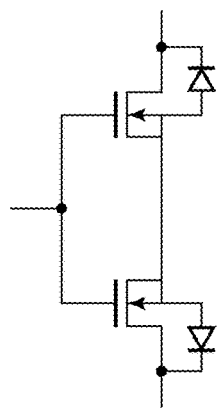
Figure 3E:
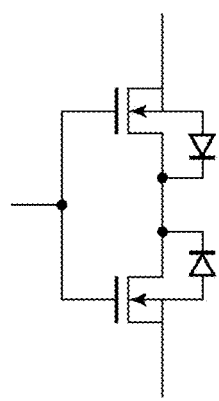
Figure 3F:
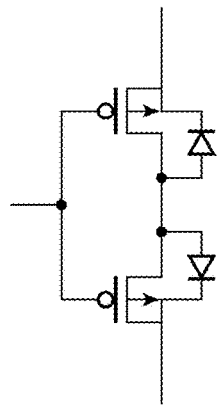

The first switch SW1 and the second switch SW2 are each configured employing a MOSFET (Metal Oxide Semiconductor Field Effect Transistor), IGBT (Insulated Gate Bipolar Transistor), bipolar transistor, or the like. FIGS. 3A and 3B are diagrams each showing an example configuration of a switch employing a MOSFET.

FIG. 3A shows a configuration of the switch employing an N-channel MOSFET. FIG. 3B shows a configuration of the switch employing a P-channel MOSFET. In a case in which the back gate of the MOSFET is connected to its source, the body diode that forms between the back gate and the drain is in the connection state regardless of the gate voltage. Thus, such a switch configured as a single MOSFET is not capable of blocking a current that flows in one particular direction. In the present specification, such a switch will be referred to as a "uni-directional switch".

The switches shown in FIGS. 3C through 3F each comprise two N-channel MOSFETs or otherwise two P-channel MOSFETs connected such that their body diodes are connected in reverse directions (back-to-back connection). With the switches shown in FIGS. 3C through 3F, in the off state, no current flows in either direction. In the present specification, such a switch will be referred to as a "bi-directional switch".

With the present embodiment, the switches SW1 and SW2 may each be configured as a uni-directional switch or otherwise a bi-directional switch. It should be noted that, in a case in which the switches SW1 and SW2 are each configured as a uni-directional switch, there is a need to pay attention to their switching phases. Detailed description thereof will be made later.

The above is the configuration of the wireless power transmitting apparatus 2. Next, description will be made regarding the operation thereof.

Let us consider an arrangement in which the switches SW1 and SW2 are each configured as a bi-directional switch which is capable of blocking a current in both directions in the off state.

FIG. 4 shows waveform diagrams each showing the operation of the wireless power transmitting apparatus 2 shown in FIG. 2. FIG. 4 shows, in the following order beginning from the top, the voltage at the first high-side switch SWH1, the voltage at the first low-side switch SWL1, the driving voltage $V_{DRV}$, the voltage at the first switch SW1, the voltage at the second switch SW2, the voltage $V_{CA1}$ at the first auxiliary capacitor $C_{A1}$, the voltage $V_A$ at the first terminal 31, the resonance current $I_{TX}$ that flows through the transmission antenna 20, and the resonance voltage $V_{TX}$ that develops across the transmission coil $L_{TX}$ and the resonance capacitor $C_{TX}$. In the waveform diagram for each switch, the high level represents the on state, and the low level represents the off state. It should be noted that FIG. 4 shows the waveforms of the resonance current $I_{TX}$ and the resonance voltage $V_{TX}$ obtained after a sufficient time has elapsed after the automatic tuning assist circuit 30 starts to operate.

As shown in FIG. 4, by switching on and off the first high-side switch SWH1 and the first low-side switch SWL1 in a complementary manner, such an arrangement is capable of generating the driving voltage $V_{DRV}$ having a rectangular waveform. The driving voltage $V_{DRV}$ thus generated is applied across the transmission antenna 20 and the automatic tuning assist circuit 30. The first control unit 40 is configured to switch on and off the first switch SW1 and the second switch SW2 in a complementary manner, with the same frequency as that of the driving voltage $V_{DRV}$, and with a phase that is delayed by $\theta_{TX}$ (=90 degrees) with respect to the driving voltage $V_{DRV}$. The resonance current $I_{TX}$ flows to the first auxiliary capacitor $C_{A1}$ during the on time $T_{ON1}$ of the first switch SW1, and flows to the ground via the second switch SW2 during the on time $T_{ON2}$ of the second switch SW2. That is to say, the first auxiliary capacitor $C_{A1}$ is charged and discharged by means of the resonance current $I_{TX}$. As a result, the capacitor voltage $V_{CA1}$ develops at the first auxiliary capacitor $C_{A1}$.

Figure 5:
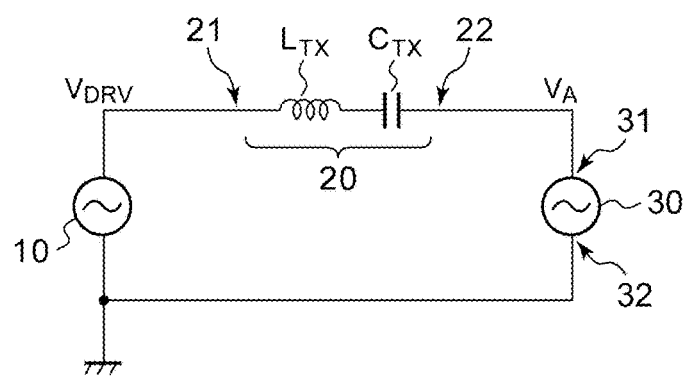
FIG. 5 is an equivalent circuit diagram of the wireless power transmitting apparatus shown in FIG. 2.

The automatic tuning assist circuit 30 is configured to apply a correction voltage $V_A$ to the second terminal 22 of the transmission antenna 20. During the on time $T_{ON1}$ of the first switch SW1, the first auxiliary capacitor voltage $V_{CA1}$ is used as the correction voltage $V_A$. On the other hand, during the on time $T_{ON2}$ of the second switch SW2, the ground voltage $V_{GND}$ is used as the correction voltage $V_A$. The automatic tuning assist circuit 30 can be regarded as a correction power supply configured to apply the correction voltage $V_A$ to the transmission antenna 20. FIG. 5 is an equivalent circuit diagram showing an equivalent circuit of the wireless power transmitting apparatus 2 shown in FIG. 2.

Figure 6A:
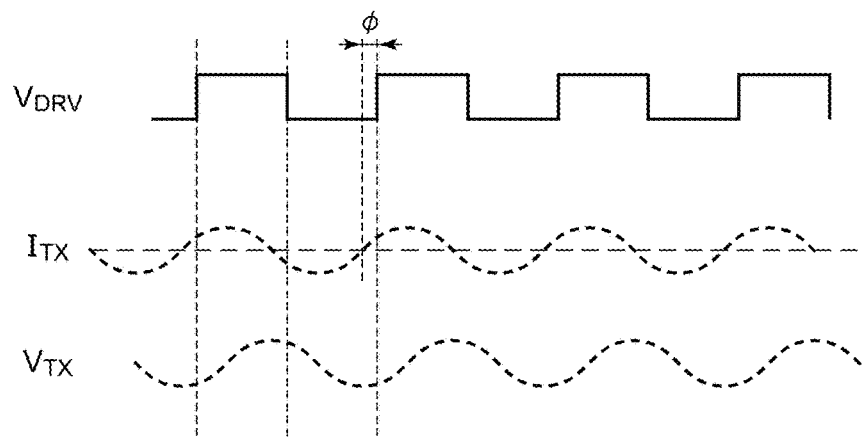
FIG. 6A is a waveform diagram showing a state in which an automatic tuning assist circuit does not operate.
Figure 6B:
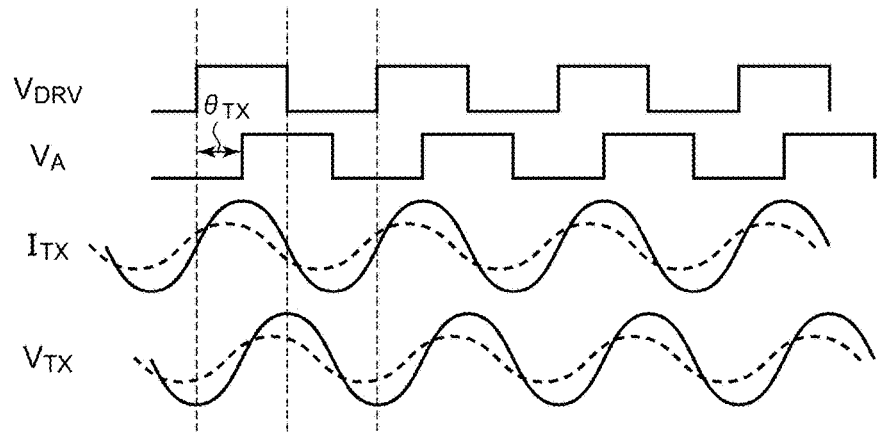
FIG. 6B is a waveform diagram showing a state in which the automatic tuning assist circuit operates.

FIG. 6A is a waveform diagram showing a state in which the automatic tuning assist circuit 30 does not operate, and FIG. 6B is a waveform diagram showing a state in which the automatic tuning assist circuit 30 operates.

First, description will be made with reference to FIG. 6A regarding the state in which the automatic tuning assist circuit 30 does not operate, i.e., a state in which the first switch SW1 is fixed to the off state, and the second switch SW2 is fixed to the on state. In this state, the correction voltage $V_A$ is fixed to the ground voltage $V_{GND}$.

The impedance Z of the transmission antenna 20 is represented by the following Expression (1). The resonance frequency $f_c$ of the transmission antenna 20 is represented by the following Expression (2). The following Expressions (1) and (2) represent the impedance and the resonance frequency assuming that the resistance component is negligible. However, it is needless to say that, in actual circuits, the resistance component connected in series contributes to the circuit impedance.

$$Z = j\omega L_{TX} + 1/(j\omega C_{TX}) \tag{1}$$

$$f_c = 1/2\pi\sqrt{(L_{TX} C_{TX})} \tag{2}$$

In a case in which the frequency $f_{TX}$ of the driving voltage $V_{DRV}$ is higher than the resonance frequency $f_c$ ($f_{TX} > f_c$), the transmission antenna 20 functions as an inductor. In this case, the resonance current $I_{TX}$ that flows through the transmission antenna 20 has a phase which is delayed with respect to the phase of the driving voltage $V_{DRV}$. Conversely, in a case in which the frequency $f_{TX}$ of the driving voltage $V_{DRV}$ is lower than the resonance frequency $f$, ($f_{TX} < f_c$), the transmission antenna 20 functions as a capacitor. In this case, the resonance current $I_{TX}$ has a phase which is advanced with respect to the driving voltage $V_{DRV}$.

FIG. 6A shows a state in which $f_c > f_{TX}$. In this state, the resonance current $I_{TX}$ has a phase which is advanced by the phase difference $\phi$ with respect to the driving voltage $V_{DRV}$. It should be noted that the phase difference $\phi$ is not 90 degrees. This is because the resonance circuit includes a non-negligible resistance component (not shown) connected in series. In the non-resonant state, the impedance Z exhibits a high value, leading to a reduced amplitude of the resonance current $I_{TX}$. In this state, such an arrangement is not capable of transmitting a large amount of electric power.

Next, description will be made with reference to FIG. 6B regarding a case in which the automatic tuning assist circuit 30 operates.

In a case in which the automatic tuning assist circuit 30 operates, the correction voltage $V_A$ is applied to the transmission antenna 20 with a phase that is delayed by $\theta_{TX} = 90$ degrees with respect to the driving voltage $V_{DRV}$. As a result, phase matching is obtained between the resonance current $I_x$ and the driving voltage $V_{DRV}$, thereby providing a quasi-resonant state. In this state, the resonance current $I_{TX}$ has a greater amplitude than that in the non-resonant state.

Figure 7:
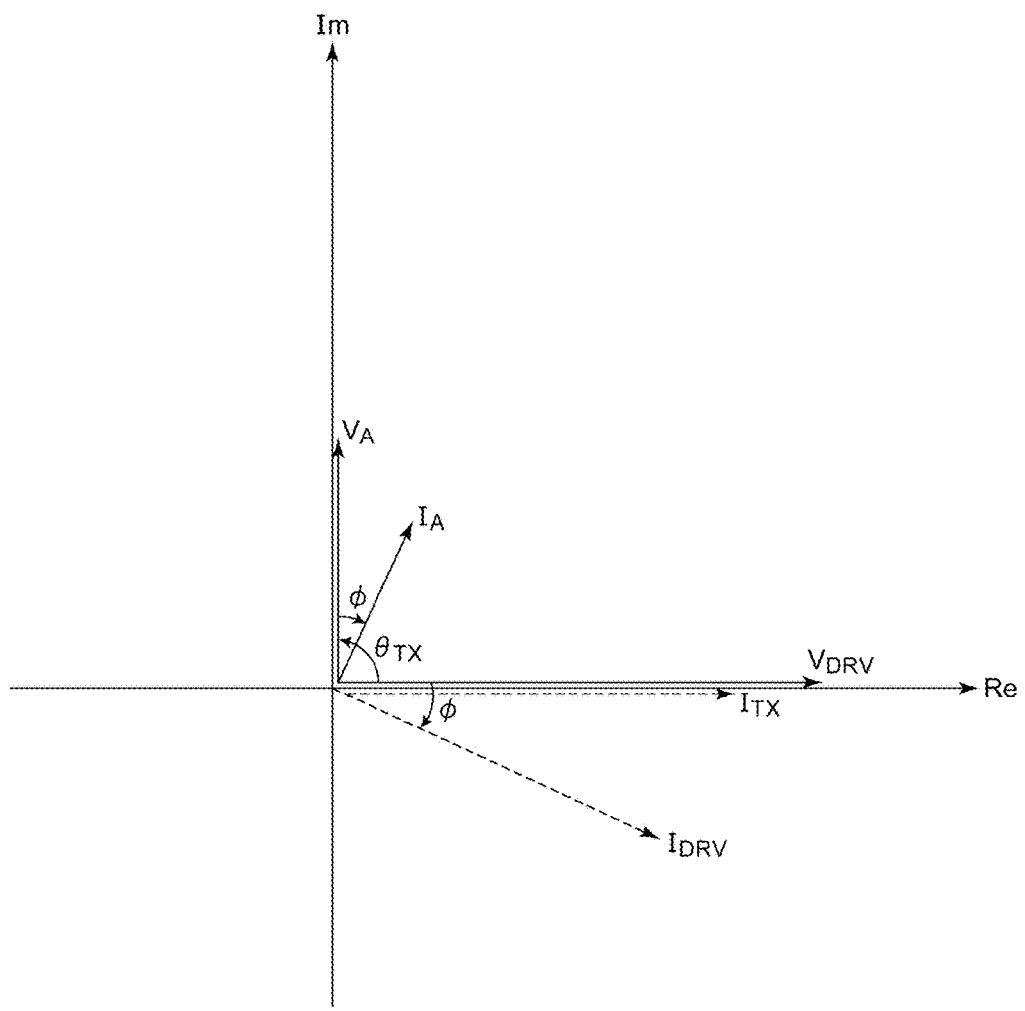
FIG. 7 is a phasor diagram for describing a quasi-resonant state provided by the automatic tuning assist circuit in a case in which $f_c < f_{TX}$.

FIG. 7 is a phasor diagram (vector diagram) for describing the quasi-resonant state provided by the automatic tuning assist circuit 30.

The phase of the driving voltage $V_{DRV}$ is 0 degrees. The phase of the correction voltage $V_A$ is $\theta_{TX}$=90 degrees. In a case in which $f_c<f_{TX}$, the current has a phase that is delayed by the phase difference $\phi$ with respect to the voltage. Thus, the phase difference $\phi$ exists between the driving voltage $V_{DRV}$ and the current component $I_{DRV}$. Furthermore, the phase difference $\phi$ exists between the correction voltage $V_A$ and the current component $V_A$.

Based on the "principle of superposition", the resonance current $I_{TX}$ is configured as the sum of the current component $I_{DRV}$ induced by the driving voltage $V_{DRV}$ and the current component $I_A$ induced by the correction voltage $V_A$. There is a phase difference of $\theta_{TX}$ (=90 degrees) between the driving voltage $V_{DRV}$ and the correction voltage $V_A$. Accordingly, there is a phase difference of 90 degrees between the current components $I_{DRV}$ and $I_A$. Thus, by optimizing the amplitude of the correction voltage $V_A$, i.e., by optimizing the amplitude of the current component $I_A$, such an arrangement is capable of providing phase matching between the driving voltage $V_{DRV}$ (having a phase of 0 degrees) and a resultant current obtained by combining the two current components $I_{DRV}$ and $I_A$, i.e., the resonance current $I_{TX}$. That is to say, it can be clearly understood that such an arrangement provides a quasi-resonant state.

The wireless power transmitting apparatus 2 according to the embodiment is capable of automatically generating the correction voltage $V_A$ which provides the quasi-resonant state, which is an important excellent advantage of the wireless power transmitting apparatus 2 according to the embodiment.

Figure 8:
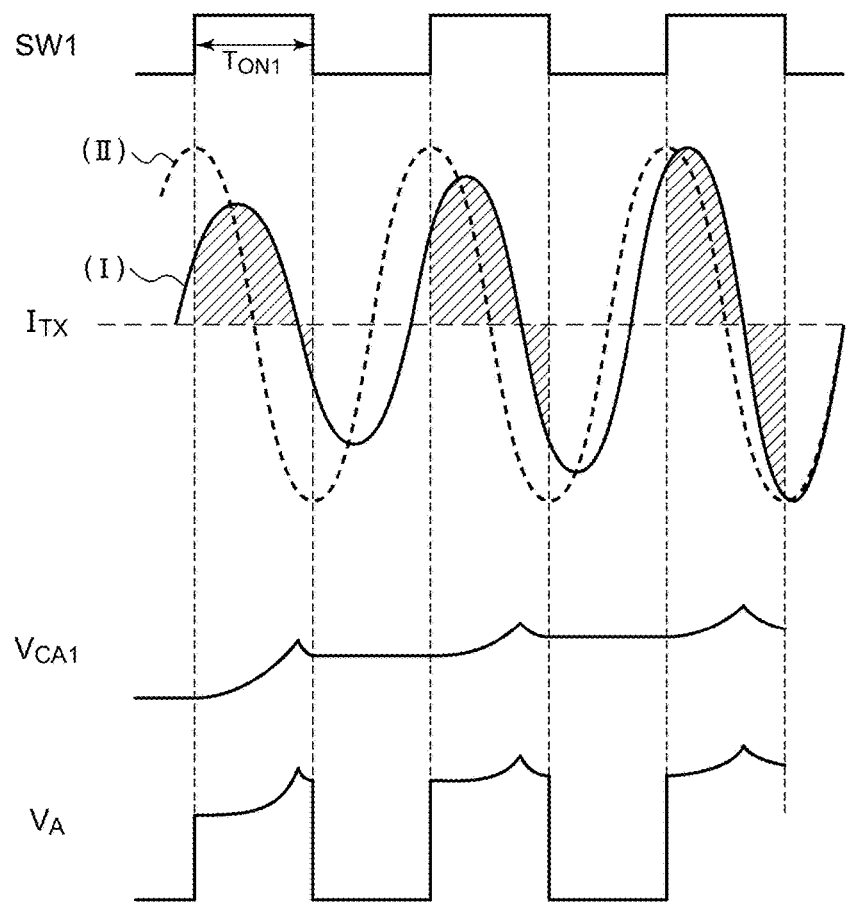
FIG. 8 is a diagram showing a resonance current in a non-resonant state and in a resonance state.

FIG. 8 is a diagram showing the resonance current $I_{TX}$ in the non-resonant state and in the resonance state. The waveform (I) represents the resonance current $I_{TX}$ in the non-resonant state. In the on time $T_{ON1}$ in which the switch SW1 is on, the first auxiliary capacitor $C_{A1}$ is charged and discharged by means of the resonance current $I_{TX}$. Specifically, the first auxiliary capacitor $C_{A1}$ is charged during a period in which the resonance current $I_{TX}$ is positive, and is discharged during a period in which the resonance current $I_{TX}$ is negative. As a result, in a case in which the period in which the resonance current $I_{TX}$ is positive is longer than the period in which the resonance current $I_{TX}$ is negative, the capacitor voltage $V_{CA1}$ rises. Otherwise, the capacitor voltage $V_{CA1}$ drops.

Let us say that the capacitor voltage $V_{CA1}$ rises in the on time $T_{ON1}$ of a certain cycle. In this case, the correction voltage $V_A$ is applied to the transmission antenna 20 according to the rising capacitor voltage $V_{CA1}$. This advances the phase of the resonance current $I_{TX}$ with respect to the resonance current $I_{TX}$ of the previous cycle. By repeatedly performing this processing, the capacitor voltage $V_{CA1}$ rises in increments of cycles, which gradually advances the phase of the resonance current $I_{TX}$. Eventually, the phase of the resonance current $I_{TX}$ shifts until it matches the phase of the driving voltage $V_{DRV}$ (resonance point). When the phase of the resonance current $I_{TX}$ exceeds the resonance point, the discharge current of the first auxiliary capacitor $C_{A1}$ becomes greater than its charging current, thereby providing a feedback control operation in the reverse direction. This reduces the capacitor voltage $V_{CA1}$, thereby returning the phase of the resonance current $I_{TX}$ to the resonance point. At the resonance point, such an arrangement provides a balance between the charging current and the discharging current of the first auxiliary capacitor $C_{A1}$ for each cycle, thereby providing an equilibrium state of the capacitor voltage $V_{CA1}$. In this state, a quasi-resonant state is maintained. As described above, with the wireless power transmitting apparatus 2 shown in FIG. 2, such an arrangement is capable of automatically generating the correction voltage $V_A$ that is required to provide the quasi-resonant state.

The above is the operation of the wireless power transmitting apparatus 2.

As described above, without adjusting the resonance frequency $f_c$ of the transmission antenna 20, the wireless power transmitting apparatus 2 is capable of automatically tuning the circuit state so as to provide the quasi-resonant state. In the wireless power transmission, the resonance frequency changes over time according to the position relation between the wireless power transmitting apparatus 2 and the wireless power receiving apparatus 4. The wireless power transmitting apparatus 2 is capable of following the change in the resonance frequency with high speed, thereby providing high-efficiency electric power transmission.

Furthermore, in a case in which a large amount of electric power is transmitted by means of wireless power transmission, a very high voltage develops between both ends of the resonance capacitor $C_{TX}$, which limits the use of a variable capacitor. With the wireless power transmitting apparatus 2, there is no need to adjust the capacitance of the resonance capacitor $C_{TX}$. Thus, such an arrangement does not require such a variable capacitor or the like, which is another advantage.

Description has been made above regarding a case in which the first switch SW1 is switched on and off with a phase that is delayed by $\theta_{TX}$ (=90 degrees) with respect to the phase of the switching of the first high-side switch SWH1. However, the phase difference $\theta_{TX}$ between the first switch SW1 and the first high-side switch SWH1 is not restricted to 90 degrees. Also, an arrangement may be made in which the phase difference $\theta_{TX}$ between the first switch SW1 and the first high-side switch SWH1 is set to 270 degrees (−90 degrees). In this case, the capacitor voltage $V_{CA1}$ is automatically adjusted such that it becomes a negative voltage.

That is to say, in a case in which $f_c<f_{TX}$, by setting the phase difference $\theta_{TX}$ to 90 degrees or otherwise 270 degrees, such an arrangement provides a quasi-resonant state.

Also, the phase difference $\theta_{TX}$ may be moved away from 90 degrees or 270 degrees. In this case, the phase difference $\theta_{TX}$ between the current components $I_{DRV}$ and $I_A$ does not match 90 degrees. However, even in such a case, the capacitor voltage $V_{CA1}$ is automatically adjusted such that the resultant resonance current $I_{TX}$ has a phase of 0 degrees. It should be noted that, as the phase difference $\theta_{TX}$ becomes closer to 90 degrees or otherwise 270 degrees, the required value of the amplitude of the current component $I_A$, i.e., the required absolute value of the capacitor voltage $V_{CA1}$, becomes smaller. This is an advantage in employing an arrangement in which the phase difference $\theta_{TX}$ is set to 90 degrees or otherwise 270 degrees.

It should be noted that, in a case in which $f_c<f_{TX}$, such an arrangement is capable of supporting the quasi-resonant state in which the phase difference $\theta_{TX}$ is set to 270 degrees only in a case in which the first switch SW1 and the second switch SW2 are each configured as a bi-directional switch. In other words, in a case in which the first switch SW1 and the second switch SW2 are each configured as a uni-directional switch, such an arrangement is not capable of supporting the quasi-resonant state in which the phase difference $\theta_{TX}$ is set to 270 degrees. This is because the current flows through the body diode. Thus, in a case in which the first switch SW1 and the second switch SW2 are each configured as a uni-directional switch, there is a need to switch on and off the first switch SW1 and the second switch SW2 with a phase such that no current flows through the body diodes which each function as an inversely conducting element.

The wireless power transmitting apparatus 2 automatically provides a quasi-resonant state not only in a case in which $f_c < f_{TX}$, but also in a case in which $f_c > f_{TX}$. In this case, the phase difference $\theta_{TX}$ is preferably set to 270 degrees (−90 degrees).

Figure 9:
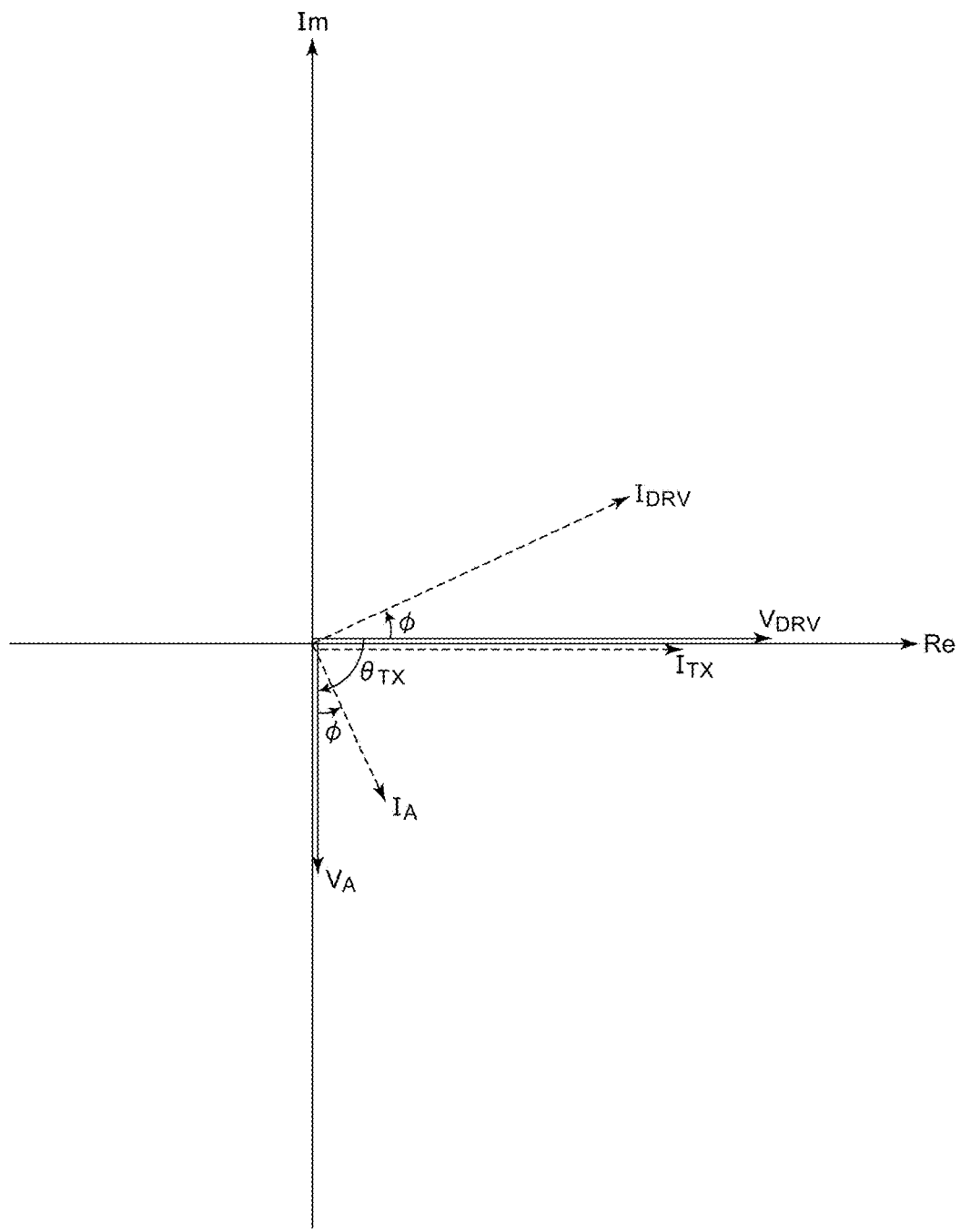
FIG. 9 is a phasor diagram for describing a quasi-resonant state provided by the automatic tuning assist circuit in a case in which $f_c > f_{TX}$.

FIG. 9 is a phasor diagram for describing a quasi-resonant state provided by the automatic tuning assist circuit 30 in a case in which $f_c > f_{TX}$. Description will be made below assuming that the driving voltage $V_{DRV}$ has a phase of 0 degrees, and the correction voltage $V_A$ has a phase $\theta_{TX}$ of 270 degrees (−90 degrees). In a case in which $f_c > f_{TX}$, the current has a phase which is advanced with respect to that of the voltage. Such an arrangement also provides a quasi-resonant state even in such a case.

It should be noted that, in a case in which $f_c > f_{TX}$, the phase difference $\theta_{TX}$ may be set to a value in the vicinity of 90 degrees. In this case, the capacitor voltage $V_{CA1}$ is automatically adjusted such that it becomes a negative voltage so as to provide a quasi-resonant state.

It should be noted that, in a case in which $f_c < f_{TX}$, such an arrangement is capable of supporting the quasi-resonant state in which the phase difference $\theta_{TX}$ is set to 90 degrees only in a case in which the first switch SW1 and the second switch SW2 are each configured as a bi-directional switch. In other words, in a case in which the first switch SW1 and the second switch SW2 are each configured as a uni-directional switch, such an arrangement is not capable of supporting the quasi-resonant state in which the phase difference $\theta_{TX}$ is set to 90 degrees. This is because the current flows through the body diode.

Next, description will be made regarding modifications of the wireless power transmitting apparatus 2. Each modification may be combined with any one of the other modifications, which is encompassed within the scope of the present invention.

Description has been made above regarding an arrangement in which the first control unit 40 drives multiple switches included in the automatic tuning assist circuit 30 with the same frequency $f_{TX}$ as that of the driving voltage $V_{DRV}$. However, the present invention is not restricted to such an arrangement. Also, the first control unit 40 may be configured to switch on and off the aforementioned switches with a frequency obtained by multiplying or dividing the frequency of the driving voltage $V_{DRV}$ by an odd number. Such an arrangement also provides a quasi-resonant state.

Figure 10:
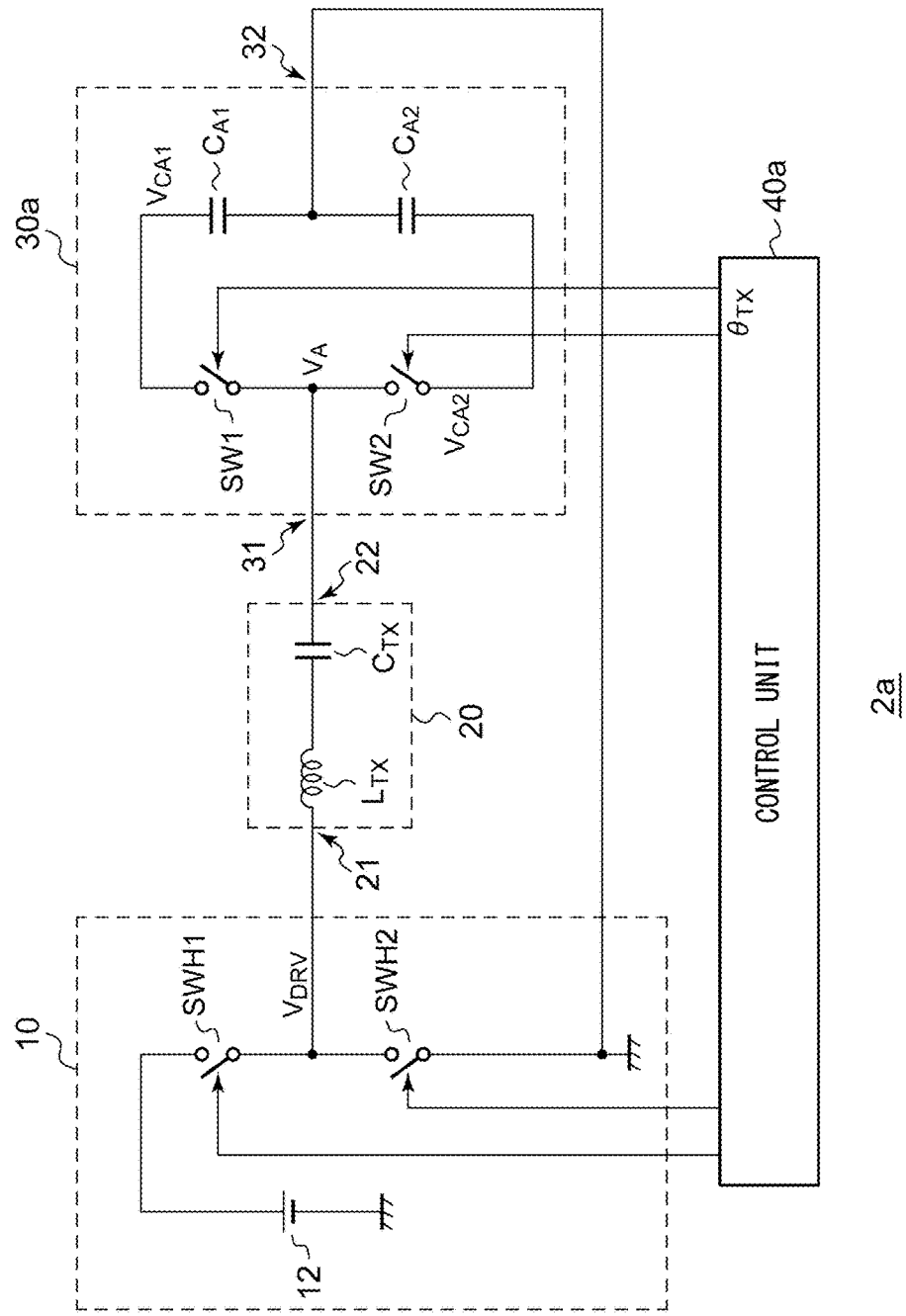
FIG. 10 is a circuit diagram showing a configuration of a wireless power transmitting apparatus according to a first modification.

FIG. 10 is a circuit diagram showing a configuration of a wireless power transmitting apparatus 2a according to a first modification. An automatic tuning assist circuit 30a includes a second auxiliary capacitor $C_{A2}$ between the first terminal 31 and the second terminal 32 such that it is connected in series with the second switch SW2.

With such a modification, during the on time $T_{ON1}$ of the first switch SW1, the correction voltage $V_A$ is set to the capacitor voltage $V_{CA1}$. During the on time $T_{ON2}$ of the second switch SW2, the correction voltage $V_A$ is set to the capacitor voltage $V_{CA2}$.

With the wireless power transmitting apparatus 2a, by optimizing the capacitor voltages $V_{CA1}$ and $V_{CA2}$, such an arrangement provides a quasi-resonant state both in the case in which $V_{TX} > f_c$ and in the case in which $V_{TX} < f_c$.

Figure 11:
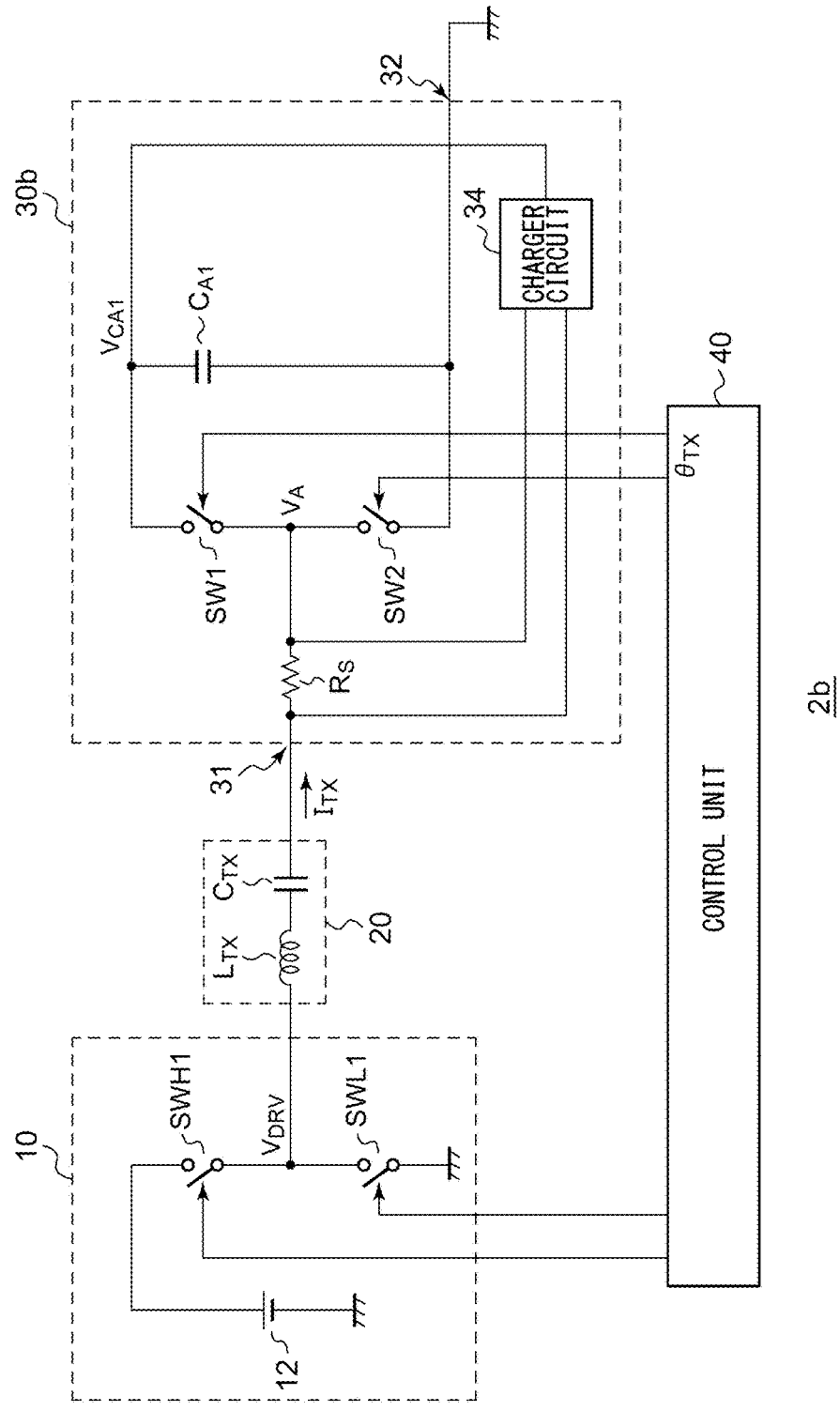
FIG. 11 is a circuit diagram showing a configuration of a wireless power transmitting apparatus according to a second modification.

FIG. 11 is a circuit diagram showing a configuration of a wireless power transmitting apparatus 2b according to a second modification. An automatic tuning assist circuit 30b includes a charger circuit 34 and a detection resistor Rs. The detection resistor Rs is arranged on a path of the resonance current $I_{TX}$. A detection voltage $V_S$ develops at the detection resistor Rs in proportion to the resonance current $I_{TX}$. The charger circuit 34 is configured to charge the first auxiliary capacitor $C_{A1}$ based on the detection voltage $V_S$ so as to provide a quasi-resonant state. As described above, the capacitor voltage $V_{CA1}$ automatically becomes the optimum level. In addition, by providing the charger circuit 34, such an arrangement provides a quasi-resonant state in a shorter period of time.

Figure 12:
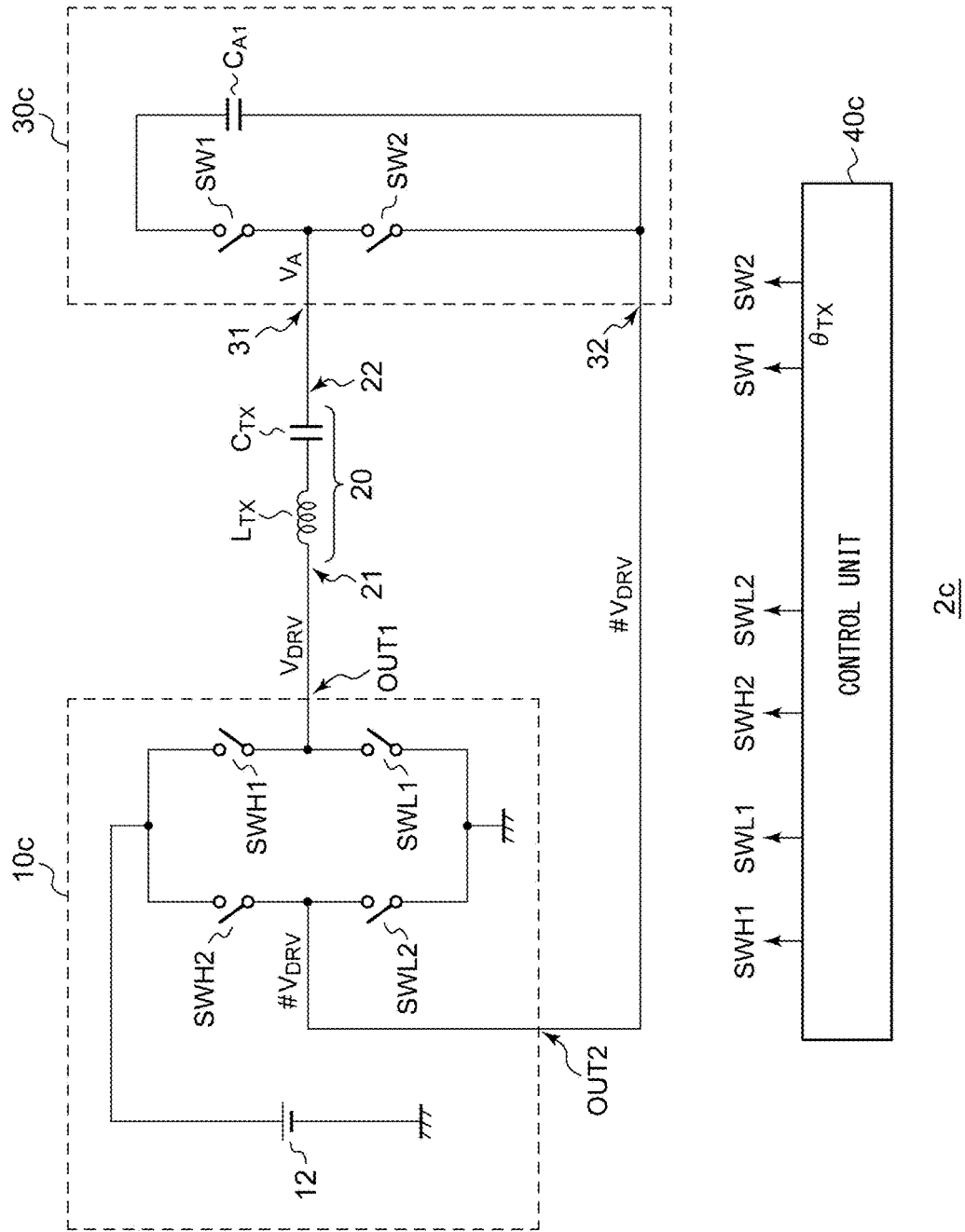
FIG. 12 is a circuit diagram showing a configuration of a wireless power transmitting apparatus according to a third modification.

FIG. 12 is a circuit diagram showing a configuration of a wireless power transmitting apparatus 2c according to a third modification. Description has been made in which the power supply is configured as a half-bridge circuit. In contrast, a power supply 10c shown in FIG. 12 is configured as an H-bridge circuit. A second high-side switch SWH2 and a second low-side switch SWL2 are sequentially connected in series between the output terminal of the power supply 12 and a fixed voltage terminal (ground terminal).

The first control unit 40c is configured to repeatedly switch states between a state in which the pair of the high-side switch SWH1 and the second low-side switch SWL2 are turned on and a state in which the pair of the second high-side switch SWH2 and the first low-side switch SWL1 are turned on.

A driving voltage $V_{DRV}$ that develop at a connection node (first output terminal) OUT1 that connects the first high-side switch SWH1 and the first low-side switch SWL1 has a phase that is the reverse of the phase of a driving voltage $\#V_{DRV}$ that develops at a connection node (second output terminal) OUT2 that connects the second high-side switch SWH2 and the second low-side switch SWL2. The transmission antenna 20 and an automatic tuning assist circuit 30c are coupled in series between the first output terminal OUT1 and the second output terminal OUT2.

With the wireless power transmitting apparatus 2c shown in FIG. 12, such an arrangement provides the same advantages as those provided by the wireless power transmitting apparatus described above.

Figure 13A:
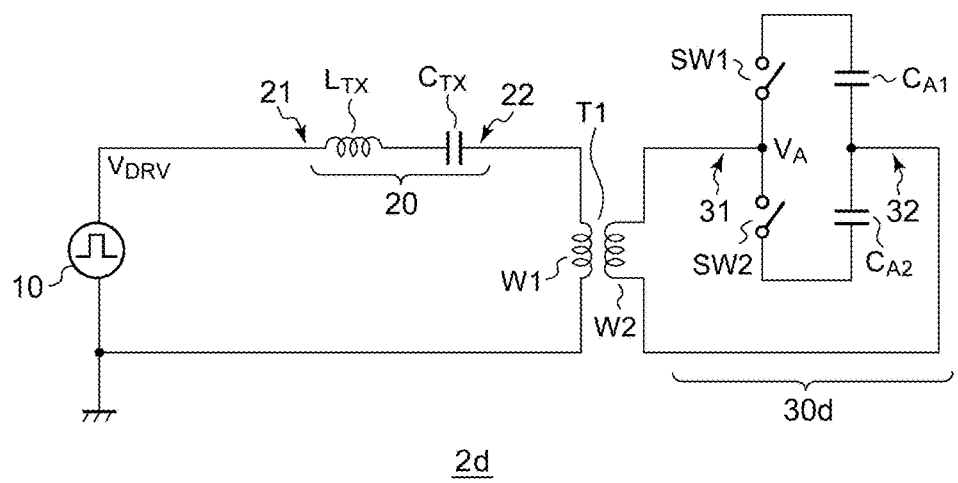
FIGS. 13A and 13B are circuit diagrams showing the configurations of wireless power transmitting apparatuses according to a fourth modification and a fifth modification, respectively.
Figure 13B:
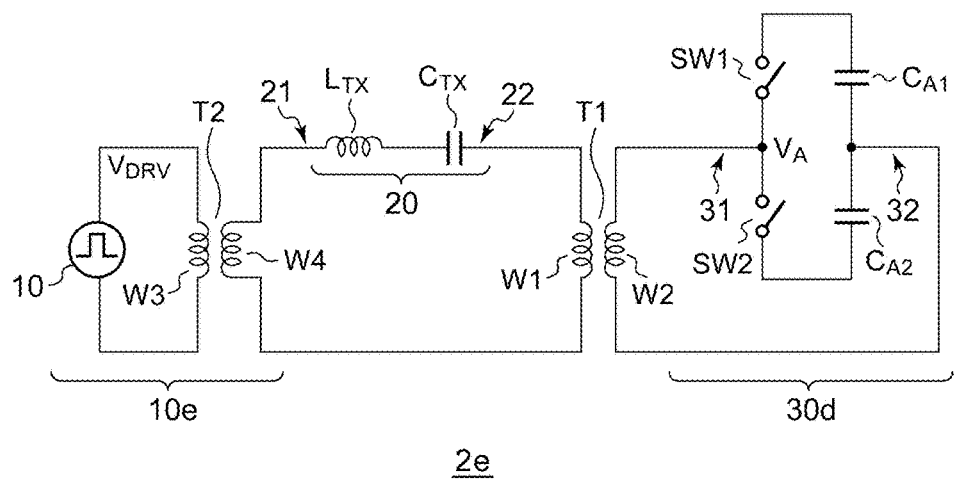

FIGS. 13A and 13B are circuit diagrams showing the configurations of wireless power transmitting apparatuses 2d and 2e according to a fourth modification and a fifth modification. The first control unit 40 is omitted from the diagrams.

With the wireless power transmitting apparatus 2d shown in FIG. 13A, an automatic tuning assist circuit 30d is coupled in series with the transmission antenna 20 via a first transformer T1. Specifically, a secondary winding W2 of the first transformer T1 is arranged between the first terminal 31 and the second terminal 32, and a primary winding W1 of the first transformer T1 is arranged in series with the transmission antenna 20. The power supply 10 is configured to apply a driving voltage across the transmission antenna 20 and the primary winding W1.

With the wireless power transmitting apparatus 2d, energy is transmitted and received between the transmission antenna 20 and the automatic tuning assist circuit 30d via the transformer T1. Such an arrangement provides the same advantages as those provided by the wireless power transmitting apparatuses described above.

With an arrangement shown in FIG. 13B, the power supply 10 is configured to apply the driving voltage $V_{DRV}$ across the transmission antenna 20 and the automatic tuning assist circuit 30d via the second transformer T2.

Specifically, the secondary winding W2 of the second transformer T2 is arranged in series with the transmission antenna 20. The power supply 10 is configured to apply the driving voltage $V_{DRV}$ between both ends of the primary winding W1 of the second transformer T2.

With the wireless power transmitting apparatus 2e, the driving voltage $V_{DRV}$ is applied across the transmission antenna 20 and the automatic tuning assist circuit 30d via the second transformer T2. Such an arrangement also provides the same advantages as those of the wireless power transmitting apparatuses described above. With the wireless power transmitting apparatus 2e, the first transformer T1 may be omitted. The power supply 10 shown in FIGS. 13A and 13B may be configured as an H-bridge circuit, a half-bridge circuit, or any other kind of power supply.

[Wireless Power Receiving Apparatus]

The automatic tuning assist circuit described above may also be employed in the wireless power receiving apparatus. Description will be made below regarding such a wireless power receiving apparatus.

Figure 14:
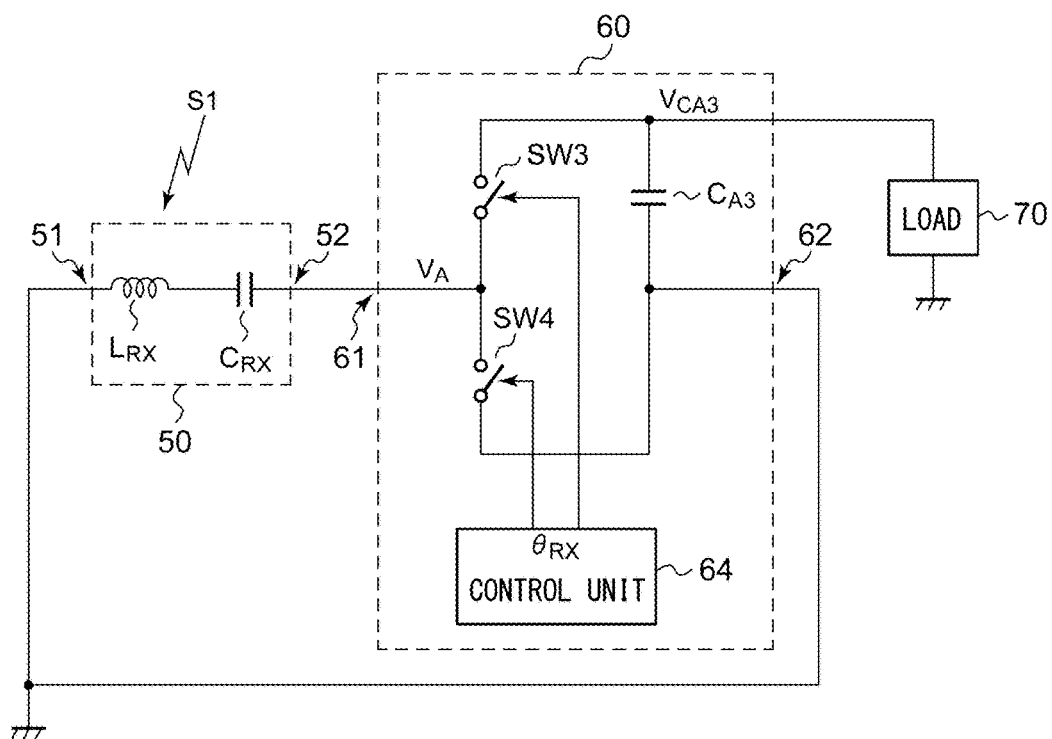
FIG. 14 is a circuit diagram showing a configuration of a wireless power receiving apparatus according to the first embodiment.

FIG. 14 is a circuit diagram showing a configuration of a wireless power receiving apparatus 4 according to the first embodiment. The wireless power receiving apparatus 4 is configured to receive the electric power signal S1 transmitted from the aforementioned wireless power transmitting apparatus or otherwise a wireless power transmitting apparatus having an entirely different configuration. The electric power signal S1 is configured using the near-field components (electric field, magnetic field, or electromagnetic field) of electromagnetic waves that have not yet become radio waves.

The wireless power receiving apparatus 4 includes a reception antenna 50, an automatic tuning assist circuit 60, and a load 70 to be supplied with electric power. The load 70 may include an unshown rectifier circuit, detector circuit, or the like, as a built-in component.

The reception antenna 50 includes a reception coil $L_{RX}$ and a resonance capacitor $C_{RX}$ arranged in series between a first terminal 51 and a second terminal 52.

The automatic tuning assist circuit 60 has the same configuration as that of the automatic tuning assist circuit 30 described above. Specifically, a third switch SW3 and a third auxiliary capacitor $C_{A3}$ are arranged between a first terminal 61 and a second terminal 62. Furthermore, a fourth switch SW4 is arranged between the first terminal 61 and the second terminal 62 such that it is connected in parallel with the third switch SW3 and the third auxiliary capacitor $C_{A3}$.

The second control unit 64 is configured to switch on and off the third switch SW3 and the fourth switch SW4 in a complementary manner, with the same frequency as that of the electric power signal S1 and with a phase difference $\theta_{RX}$ with respect to the driving voltage ($V_{DRV}$) which is applied to the transmitter-side antenna. For example, the phase difference $\theta_{RX}$ is set to 180 degrees or otherwise 0 degrees.

The automatic tuning assist circuit 60 is coupled in series with the reception antenna 50. Furthermore, the load 70 to be supplied with electric power is connected to the third auxiliary capacitor $C_{A3}$.

Figure 15:
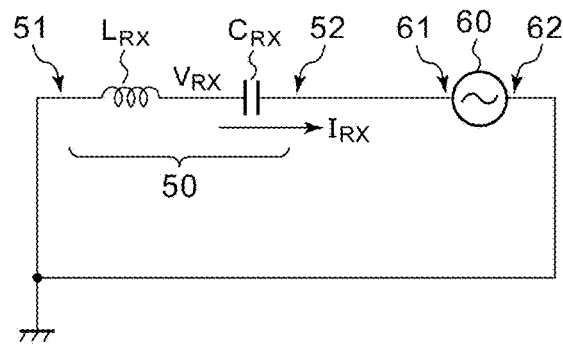
FIG. 15 is an equivalent circuit diagram of the wireless power transmitting apparatus shown in FIG. 14.

The above is the configuration of the wireless power receiving apparatus 4. Next, description will be made regarding the operation thereof. FIG. 15 is an equivalent circuit diagram showing an equivalent circuit configuration of the wireless power receiving apparatus 4 shown in FIG. 14. As with the automatic tuning assist circuit 30 of the wireless power transmitting apparatus 2, the automatic tuning assist circuit 60 can be regarded as a correction power supply configured to apply a correction voltage $V_A$ to the reception antenna 50. During the on time $T_{ON3}$ in which the third switch SW3 is turned on, the correction voltage $V_A$ is set to the voltage $V_{CA3}$ that develops at the third auxiliary capacitor $C_{A3}$. During the on time $T_{ON4}$ of the fourth switch SW4, the correction voltage $V_A$ is set to the ground voltage.

Figure 16:
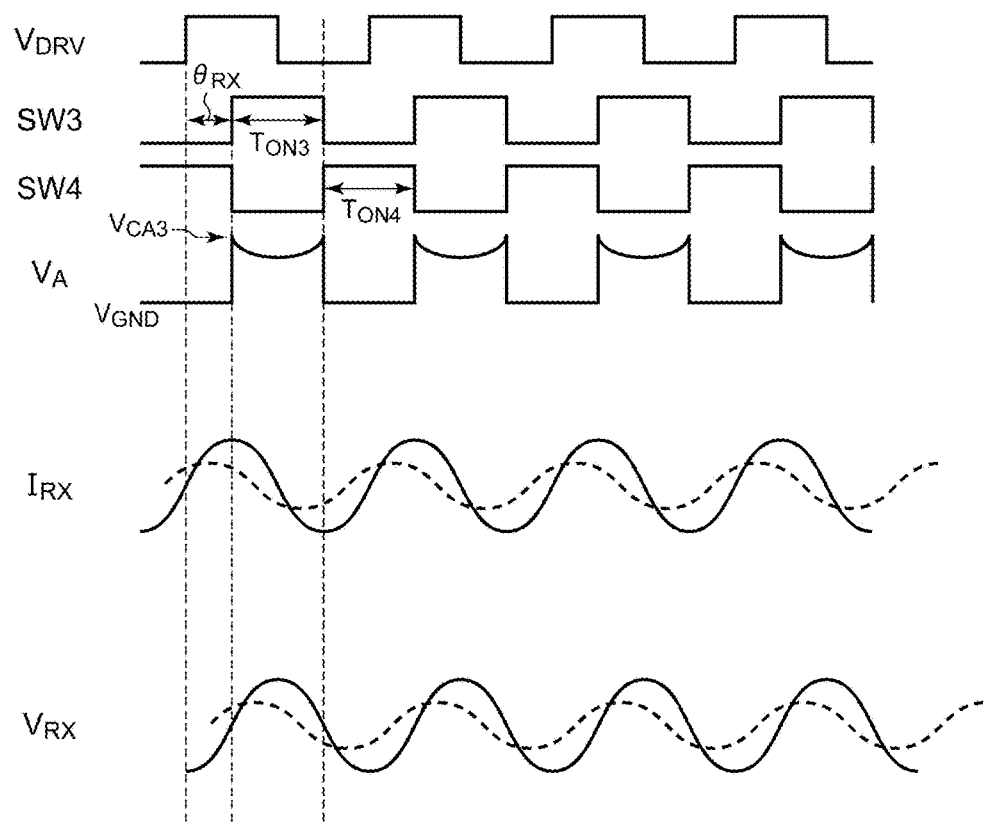
FIG. 16 is a waveform diagram showing the operation of the wireless power receiving apparatus shown in FIG. 14.

FIG. 16 is a waveform diagram showing the operation of the wireless power receiving apparatus 4 shown in FIG. 14. FIG. 16 shows, in the following order beginning from the top, the voltages applied to the third switch SW3 and the fourth switch SW4, the correction voltage $V_A$, the resonance current $I_{RX}$ that flows through the reception antenna 50, and the resonance voltage $V_{RX}$ that develops across the reception coil $L_{RX}$ and the resonance capacitor $C_{RX}$. In the waveform diagrams showing the voltages applied to the respective switches, the high-level state represents the on state, and the low-level state represents the off state. In the waveform diagrams showing the resonance current $I_{RX}$ and the resonance voltage $V_{RX}$, the solid line represents the waveform of a steady state (quasi-resonant state) after a sufficient period of time elapses after the automatic tuning assist circuit 60 starts to operate, and the broken line represents the waveform of a non-resonant state when the automatic tuning assist circuit 60 does not operate.

By switching on and off the third switch SW3 and the fourth switch SW4 in a complementary manner, with a phase $\theta_{RX}$ which is shifted by 180 degrees or otherwise 0 degrees with respect to the driving voltage $V_{DRV}$ of the wireless power transmitting apparatus side, such an arrangement charges or otherwise discharges the third auxiliary capacitor $C_{A3}$. Furthermore, by applying the correction voltage $V_A$ to the reception antenna 50, such an arrangement allows the resonance current $I_A$ to have a phase matching the phase of the driving voltage $V_{DRV}$ of the transmission side, thereby providing a quasi-resonant state.

In order to provide a quasi-resonant state, there is a need to switch on and off the third switch SW3 and the fourth switch SW4 with a suitable frequency $f_{TX}$ and with a suitable phase $\theta_{RX}$. In order to meet this requirement, the wireless power transmitting apparatus 2 may be configured to transmit the data which represents the frequency $f_{TX}$ and the phase $\theta_{RX}$ to the wireless power receiving apparatus 4. Also, the wireless power receiving apparatus 4 may be configured to sweep the phase $\theta_{RX}$ so as to detect the optimum phase $\theta_{RX}$.

The above is the operation of the wireless power receiving apparatus 4.

As described above, with the wireless power receiving apparatus 4 shown in FIG. 14, such an arrangement automatically provides a resonant state without a need to adjust the capacitance of the resonance capacitor $C_{RX}$.

Next, description will be made regarding modifications of the wireless power receiving apparatus 4.

Description has been made above regarding an arrangement in which the second control unit 64 drives the multiple switches, which are components of the automatic tuning assist circuit 60, with the same frequency as that of the electric power signal S1. However, the present invention is not restricted to such an arrangement. Also, the second control unit 64 may be configured to switch on and off the aforementioned switches with a frequency obtained by multiplying or dividing the frequency of the electric power signal S1 by an odd number. Such an arrangement also provides a quasi-resonant state.

Figure 17A:
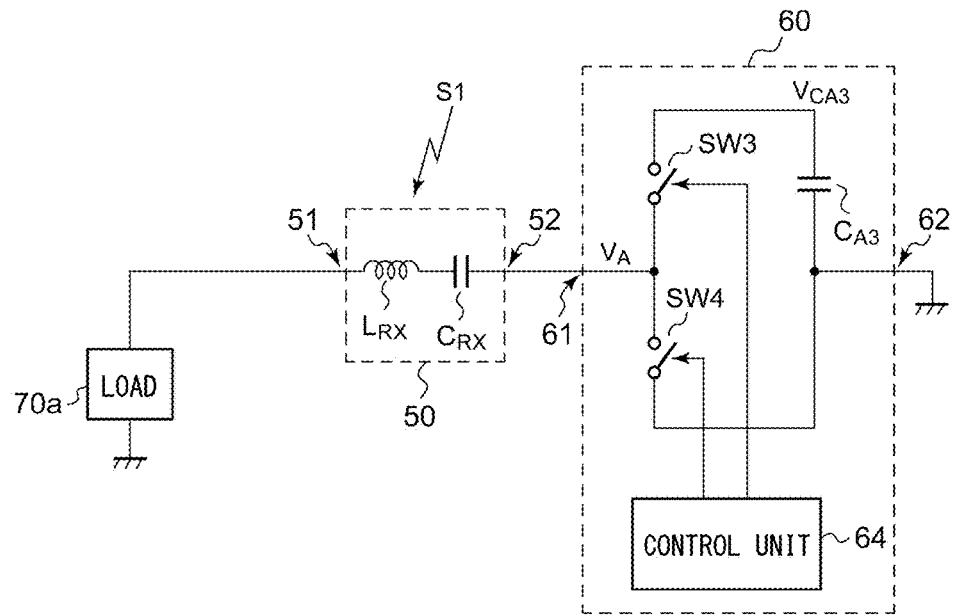
FIGS. 17A and 17B are circuit diagrams showing the configurations of wireless power receiving apparatuses according to a first modification and a second modification.
Figure 17B:
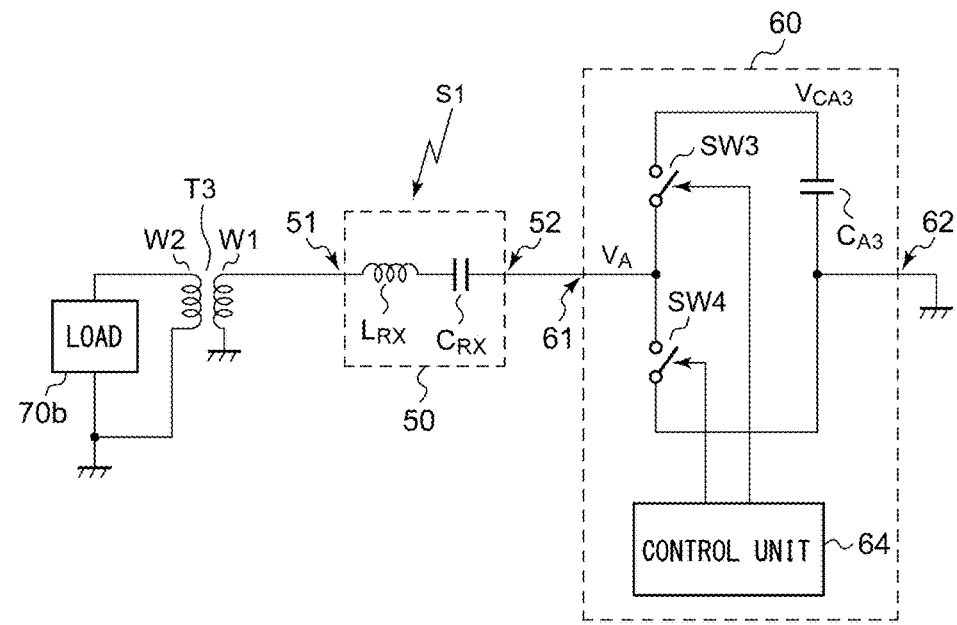

Description has been made with reference to FIG. 14 regarding an arrangement in which the load 70 is connected to the third auxiliary capacitor $C_{A3}$. Also, the load 70 may be connected to a different position. FIGS. 17A and 17B are circuit diagrams showing the configurations of wireless power receiving apparatuses according to a first modification and a second modification. With a wireless power receiving apparatus 4a shown in FIG. 17A, a load 70a is arranged in series with the reception antenna 50 and the automatic tuning assist circuit 60. Specifically, the load 70a is connected to a first terminal 51 of the reception antenna 50.

A wireless power receiving apparatus 4b shown in FIG. 17B includes a third transformer T3 by means of which a load 70b is insulated from the reception antenna 50. The primary winding W1 of the third transformer T3 is connected in series with the reception antenna 50. The load 70b is connected to the secondary winding W2 of the third transformer T3.

In a case in which the load is connected in series with the reception antenna 50 as shown in FIGS. 17A and 17B, and in a case in which the load has a low impedance, such an arrangement has an advantage of a certain level of acquisition of electric power even without the adjustment by means of the automatic tuning assist circuit 60. However, such an arrangement has a disadvantage of a reduction of the Q-value of the reception antenna 50 due to the resistance component of the load. Thus, it is difficult for such an arrangement to acquire a large amount of electric power.

Conversely, in a case in which electric power is acquired from the automatic tuning assist circuit 60 as shown in FIG. 14, the Q-value of the reception antenna 50 is not reduced due to the load 70. Thus, such an arrangement is capable of acquiring a large amount of electric power even in a case in which the load 70 has a high impedance. However, in a case in which the load 70 has a very low impedance, such an arrangement has a problem of a reduction in the efficiency of the operation of the automatic tuning assist circuit 60.

Thus, the position of the load in the circuit is preferably determined giving consideration to the electric power to be transmitted, the impedance of the load, and so forth.

Figure 18:
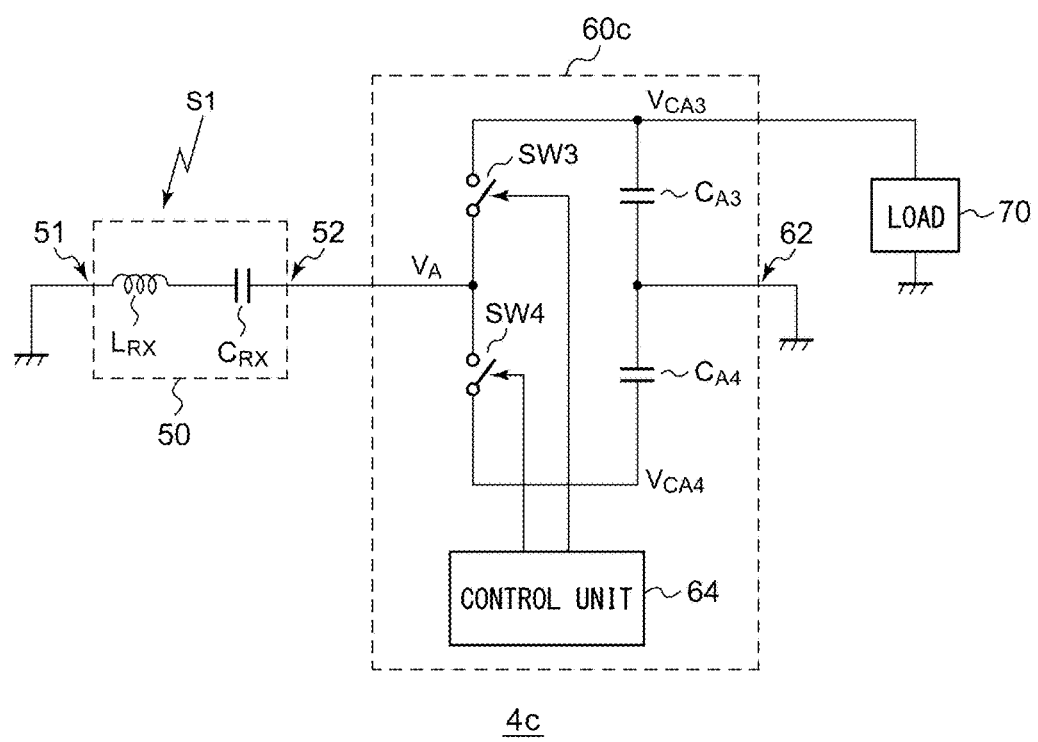
FIG. 18 is a circuit diagram showing a configuration of a wireless power receiving apparatus according to a third modification.

FIG. 18 is a circuit diagram showing a configuration of a wireless power receiving apparatus 4c according to a third modification. An automatic tuning assist circuit 60c further includes a fourth auxiliary capacitor $C_{A4}$ between the first terminal 61 and the second terminal 62 such that it is connected in series with the fourth switch SW4. The position of the load 70 is not restricted in particular.

With such a modification, during the on time $T_{ON3}$ of the third switch SW3, the correction voltage $V_A$ is set to the capacitor voltage $V_{CA3}$, and during the on time $T_{ON4}$ of the fourth switch SW4, the correction voltage $V_A$ is set to the capacitor voltage $V_{CA4}$. With the wireless power receiving apparatus 4c, the capacitor voltages $V_{CA1}$ and $V_{CA2}$ can be optimized so as to provide a quasi-resonant state in both the state in which $f_{TX}>f_c$ and the state in which $f_{TX}<f_c$.

With such a wireless power receiving apparatus, the third switch SW3 and the fourth switch SW4 may each be configured as a uni-directional switch or otherwise a bi-directional switch. In a case in which the third switch SW3 and the fourth switch SW4 are each configured as a uni-directional switch, there is a need to switch on and off the third switch SW3 and the fourth switch SW4 with a phase such that no current flows through each of the inversely conducting elements.

Figure 19A:
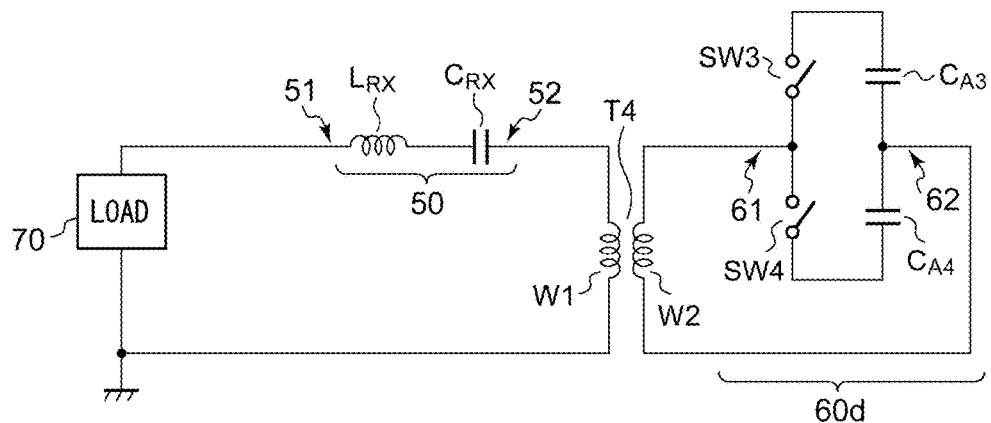
FIGS. 19A and 19B are circuit diagrams showing the configurations of wireless power receiving apparatuses according to a fourth modification and a fifth modification, respectively.
Figure 19B:
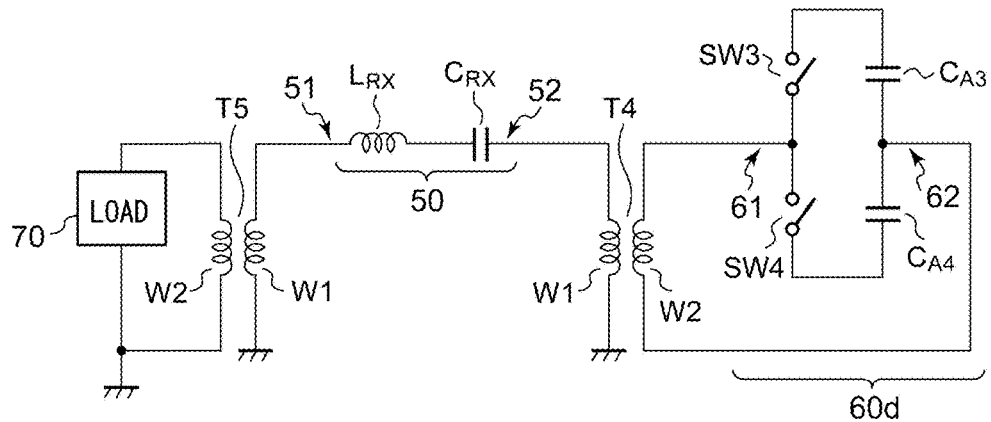

FIGS. 19A and 19B are circuit diagrams showing the configurations of wireless power receiving apparatuses according to a fourth modification and a fifth modification, respectively. The second control unit 64 is omitted from the diagrams.

With a wireless power receiving apparatus 4d shown in FIG. 19A, an automatic tuning assist circuit 60d is coupled in series with the reception antenna 50 via a fourth transformer T4. Specifically, the secondary winding W2 of the fourth transformer T4 is arranged between the first terminal 61 and the second terminal 62. The primary winding W1 of the fourth transformer T4 is arranged in series with the reception antenna 50.

With the wireless power receiving apparatus 4d, energy is transmitted and received between the reception antenna 50 and the automatic tuning assist circuit 60d via the fourth transformer T4. Such an arrangement provides the same advantages as those provided by the wireless power receiving apparatuses described above.

FIG. 19B shows an arrangement in which the load 70 is coupled with the reception antenna 50 and the automatic tuning assist circuit 60d via a fifth transformer T5. Specifically, the primary winding W1 of the fifth transformer T5 is connected in series with the reception antenna 50. The load 70 is connected between both ends of the secondary winding W2 of the fifth transformer T5.

Such an arrangement also provides the same advantages as those provided by the wireless power receiving apparatuses described above. With such a wireless power receiving apparatus 4e, the fourth transformer T4 may be omitted. With such an arrangement shown in FIG. 19A, the load 70 may be coupled with the third auxiliary capacitor $C_{A3}$. Also, with such an arrangement shown in FIG. 19B, the load 70 may be coupled with the third capacitor $C_{A3}$ via a fifth transformer T5.

[Wireless Power Transmission System]

By combining the wireless power transmitting apparatus and the wireless power receiving apparatus described above, such an arrangement provides a wireless power transmission system.

Figure 20:
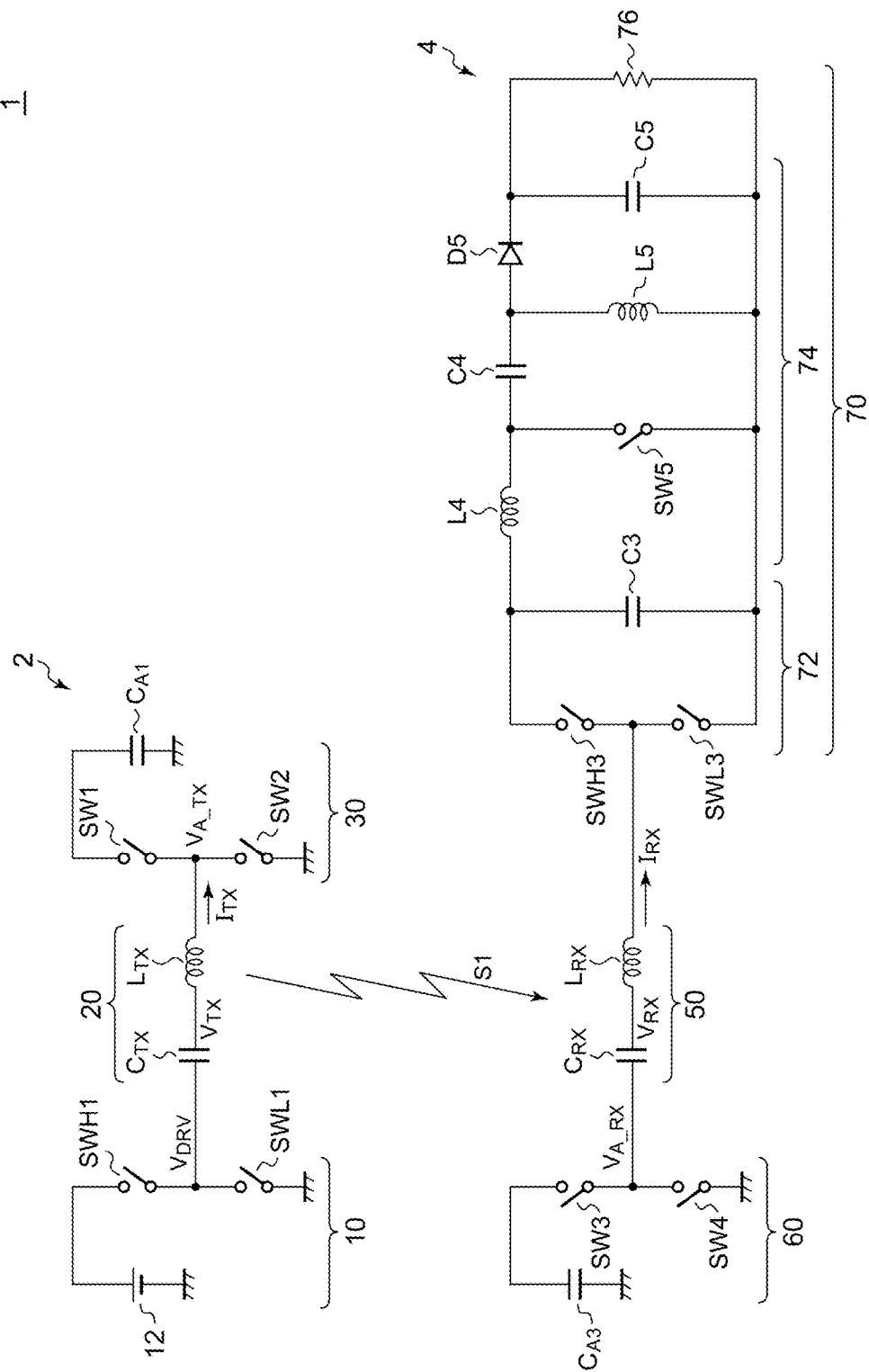
FIG. 20 is a circuit diagram showing an example configuration of a wireless power transmission system according to the first embodiment.

FIG. 20 is a circuit diagram showing an example configuration of a wireless power transmission system according to the first embodiment. The wireless power transmission system 1 includes the wireless power transmitting apparatus 2 and the wireless power receiving apparatus 4.

The load 70 includes a rectifier circuit 72 and a switching regulator 74, in addition to a load circuit 76. The rectifier circuit 72 is configured as a synchronous detector circuit, and includes a smoothing capacitor C3, a third high-side switch SWH3, and a third low-side switch SWL3.

The switching regulator 74 is configured as a step-up converter, and controlled so as to be capable of supplying the load circuit 76 with the maximum electric power.

The configuration and the operation of the switching regulator 74 are known, and accordingly, description thereof will be omitted.

Figure 21:
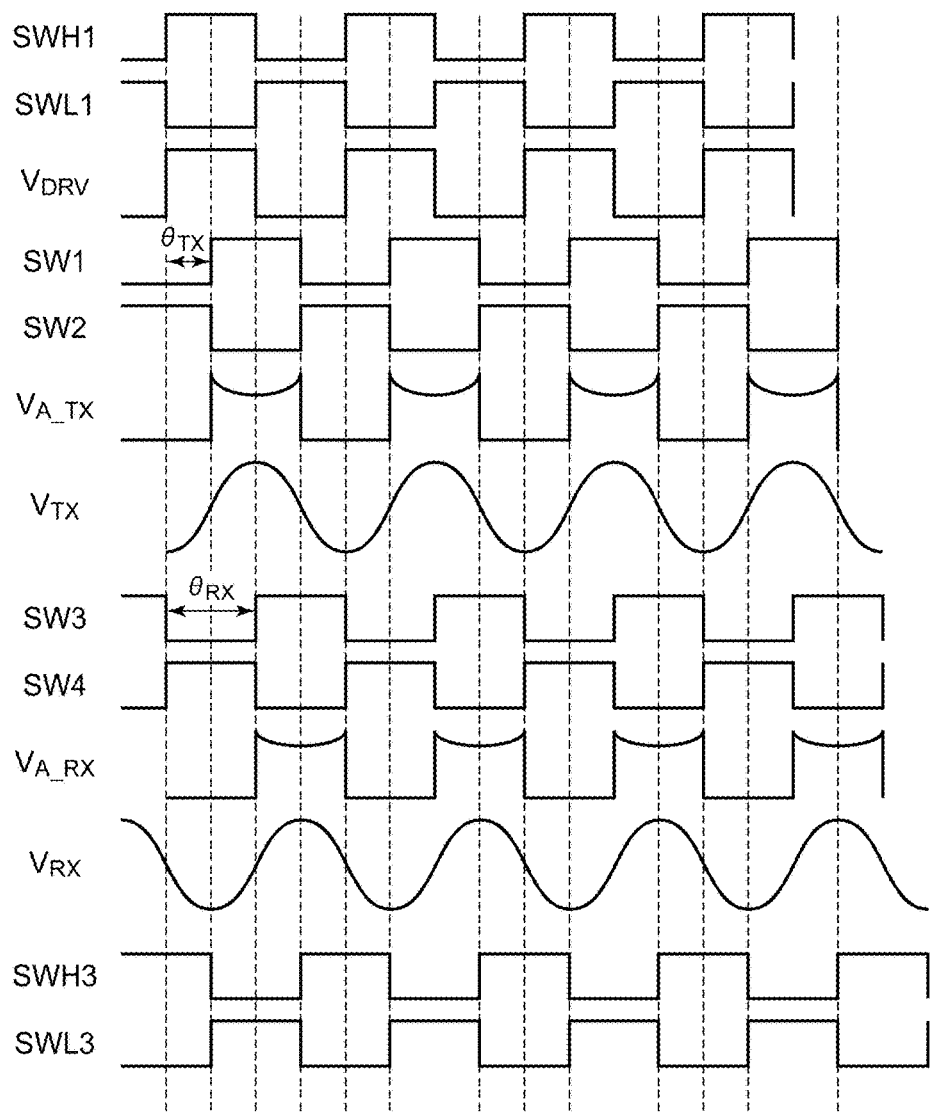
FIG. 21 is a waveform diagram showing the operation of the wireless power transmission system shown in FIG. 20.

The above is the configuration of the wireless power transmission system 1. FIG. 21 is a waveform diagram showing the operation of the wireless power transmission system 1 shown in FIG. 20.

With the wireless power transmitting apparatus 2, the first switch SW1 and the second switch SW2 are driven with a phase that is delayed by $\theta_{TX}=90$ degrees with respect to the driving voltage $V_{DRV}$. As a result, the wireless power transmitting apparatus 2 provides a quasi-resonant state.

With the wireless power receiving apparatus 4, the third switch SW3 and the fourth switch SW4 are driven with a phase that is delayed by $\theta_{RX}$=180 degrees with respect to the driving voltage $V_{DRV}$ employed on the wireless power transmitting apparatus 2 side. The third switch SW3 is driven with a phase that is delayed by 90 degrees with respect to the first switch SW1. As a result, the wireless power receiving apparatus 4 also provides a quasi-resonant state.

The third high-side switch SWH3 and the third low-side switch SWL3 of the rectifier circuit 72 are driven with a phase that is delayed by 90 degrees with respect to the third switch SW3 and the fourth switch SW4. As a result, a DC voltage is generated at the smoothing capacitor C3. The switching regulator 74 is configured to convert the DC voltage thus generated into an optimum voltage level for the load circuit 76.

The above is the operation of the wireless power transmission system 1. As described above, with the wireless power transmission system 1, the wireless power transmitting apparatus 2 and the wireless power receiving apparatus 4 each include an automatic tuning assist circuit. Thus, such an arrangement allows the maximum electric power to be transmitted to the load 70.

It is needless to say that any of the aforementioned wireless power transmitting apparatuses 2 including the modifications may be combined with any of the aforementioned wireless power receiving apparatuses 4 including the modifications.

Description has been made with reference to FIG. 20 regarding an arrangement in which an automatic tuning assist circuit is mounted on both the wireless power transmitting apparatus 2 and the wireless power receiving apparatus 4. However, the present invention is not restricted to such an arrangement.

Also, an arrangement may be made in which such an automatic tuning assist circuit is provided to only the wireless power transmitting apparatus 2, and the wireless power receiving apparatus is configured to adjust the resonance capacitor $C_{RX}$ in the same way as with conventional techniques.

Conversely, an arrangement may be made in which such an automatic tuning assist circuit is provided to only the wireless power receiving apparatus 4, and the wireless power transmitting apparatus 2 is configured to adjust the resonance capacitor $C_{TX}$ in the same way as with conventional techniques.

Also, an arrangement may be made in which such an automatic tuning assist circuit is provided to only the wireless power transmitting apparatus 2, and the wireless power receiving apparatus 4 has no adjustment mechanism. Alternatively, an arrangement may be made in which such an automatic tuning assist circuit is provided to only the wireless power receiving apparatus 4, and the wireless power transmitting apparatus 2 has no adjustment mechanism.

With such arrangements, tuning is performed by means of a single automatic tuning assist circuit so as to provide impedance matching between the power supply 10 and the load 70, thereby providing high-efficiency electric power transmission. It is needless to say that, with such arrangements, the optimum value of the phase $\theta_{TX}$ ($\theta_{RX}$) of the switching of the automatic tuning assist circuit does not match the aforementioned values, i.e., 90 degrees or otherwise 270 degrees (180 degrees or otherwise 0 degrees).

Description has been made regarding the present invention with reference to the first embodiment. The above-described embodiment has been described for exemplary purposes only, and is by no means intended to be interpreted restrictively. Rather, it can be readily conceived by those skilled in this art that various modifications may be made by making various combinations of the aforementioned components or processes, which are also encompassed in the technical scope of the present invention. Description will be made below regarding such modifications.

With the wireless power transmitting apparatus 2 including the automatic tuning assist circuit 30, in some cases, such an arrangement is capable of providing a quasi-resonant state even without including the resonance capacitor $C_{TX}$. In this case, such a resonance capacitor $C_{TX}$ may be omitted. In the same way, an arrangement may be made in which the wireless power receiving apparatus 4 including the automatic tuning assist circuit 60 does not include the resonance capacitor $C_{RX}$.

The wireless power transmitting apparatus 2 is configured to encrypt the electric power signal S1 by changing at least one of the frequency $f_{TX}$ and the phase of the driving voltage $V_{DRV}$ according to a predetermined rule (encryption code). In a case in which the wireless power receiving apparatus 4 knows the encryption code, the wireless power receiving apparatus 4 controls the switching frequency and phase of the automatic tuning assist circuit 60 based on the encryption code. As a result, even if the electric power signal S1 is encrypted, such an arrangement is capable of decrypting the electric power signal S1 and receiving the power supply. In a case in which a wireless power receiving apparatus does not know the encryption code, the wireless power receiving apparatus cannot appropriately control the switching operation of the automatic tuning assist circuit 60. Thus, such a wireless power receiving apparatus cannot receive electric power. With wireless power transmission, there is a problem of potential power theft by malicious users. However, by employing such an automatic tuning assist circuit, such a problem can be solved.

Also, in a case in which a single wireless power transmitting apparatus 2 supplies electric power to multiple wireless power receiving apparatuses 4, by employing such an automatic tuning assist circuit, such an arrangement is capable of controlling the amount of electric power to be supplied to each terminal.

[Second Embodiment]

Description has been made in the first embodiment regarding the automatic tuning assist circuit including the two switches SW1 and SW2. An automatic tuning assist circuit according to a second embodiment has a configuration including four switches. The automatic tuning assist circuit according to the second embodiment has the same block configuration as that of the first embodiment except for the automatic tuning assist circuit 80. Also, various kinds of modifications as described in the first embodiment may effectively be made for the second embodiment.

[Wireless Power Transmitting Apparatus]

Figure 22:
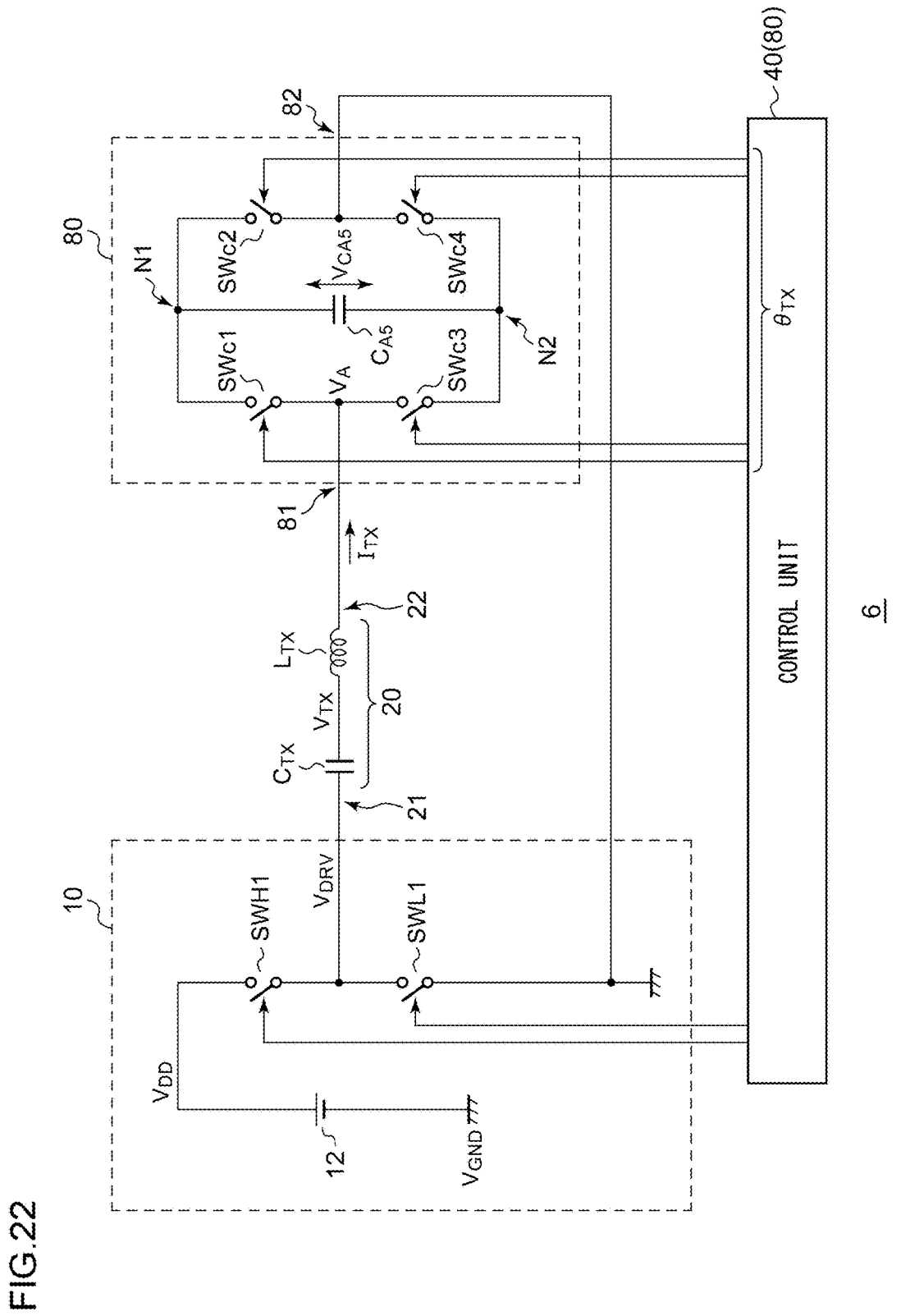
FIG. 22 is a circuit diagram showing a configuration of a wireless power receiving apparatus according to a second embodiment.

FIG. 22 is a circuit diagram showing a configuration of a wireless power transmitting apparatus 6 according to a second embodiment. The wireless power transmitting apparatus 6 is configured to transmit an electric power signal S1 to a wireless power receiving apparatus (not shown). The electric power signal S1 is configured using the near-field components (electric field, magnetic field, or electromagnetic field) of electromagnetic waves that have not yet become radio waves.

The wireless power transmitting apparatus 6 includes a power supply 10, a transmission antenna 20, an automatic tuning assist circuit 80, and a first control unit 40.

The transmission antenna 20 includes a transmission coil $L_{TX}$ arranged between its first terminal 21 and its second terminal 22. A resonance capacitor $C_{TX}$ is arranged in series with the transmission coil $L_{TX}$. The resonance capacitor $C_{TX}$ and the transmission coil $L_{TX}$ may also be mutually exchanged.

The automatic tuning assist circuit 80 is coupled in series with the transmission antenna 20. The power supply 10 is configured as a half-bridge circuit in the same way as shown in FIG. 2. The power supply 10 is configured to apply an AC driving voltage $V_{DRV}$ having a predetermined transmission frequency $f_{TX}$ between the respective terminals of the circuit that comprises the transmission antenna 20 and the automatic tuning assist circuit 80. The driving voltage $V_{DRV}$ may be configured to have a desired AC waveform, examples of which include a rectangular waveform, a trapezoidal waveform, a sine waveform, and the like. With the present embodiment, the driving voltage $V_{DRV}$ is configured as a rectangular wave signal which swings between a first voltage level (power supply voltage $V_{DD}$) and a second voltage level (ground voltage $V_{GND}$=0 V).

The power supply 10 is configured as a half-bridge circuit, as with the power supply 10 shown in FIG. 2. The first control unit 40 is configured to switch on and off the first high-side switch SWH1 and the first low-side switch SWL1 in a complementary manner, with a transmission frequency $f_{TX}$.

With the second embodiment, the automatic tuning assist circuit 80 includes a first terminal 81, a second terminal 82, a first switch SWc1 through a fourth switch SWc4, and a first auxiliary capacitor $C_{A5}$.

The first switch SWc1 and the second switch SWc2 are sequentially arranged in series between the first terminal 81 and the second terminal 82. The third switch SWc3 and the fourth switch SWc4 are sequentially arranged between the first terminal 81 and the second terminal 82, and are arranged in parallel with the first switch SWc1 and the second switch SWc2. The first auxiliary capacitor $C_{A5}$ is arranged between a connection node N1 that connects the first switch SWc1 and the second switch SWc2 and a connection node N2 that connects the third switch SWc3 and the fourth switch SWc4. The first auxiliary capacitor $C_{A5}$ is preferably configured to have a capacitance that is sufficiently greater than that of the resonance capacitor $C_{TX}$.

The first control unit 40 is configured to switch on and off the first switch SWc1 through the fourth switch SWc4 in a complementary manner, with the same frequency $f_{TX}$ as that of the driving voltage $V_{DRV}$, and with a predetermined phase difference $\theta_{TX}$ with respect to the driving voltage $V_{DRV}$. The phase difference $\theta_{TX}$ is preferably set to a value in the vicinity of +90 degrees or otherwise −90 degrees (270 degrees). That is to say, a part of the first control unit 40 functions as a component of the automatic tuning assist circuit 80.

In the same way as with the first embodiment, the first switch SWc1 through the fourth switch SWc4 may each be configured as a uni-directional switch or otherwise a bi-directional switch. In a case in which the first switch SWc1 through the fourth switch SWc4 are each configured as a uni-directional switch, there is a need to pay attention to their switching phases, as described above in the first embodiment.

The above is the configuration of the wireless power transmitting apparatus 6. Next, description will be made regarding the operation thereof.

Figure 23:
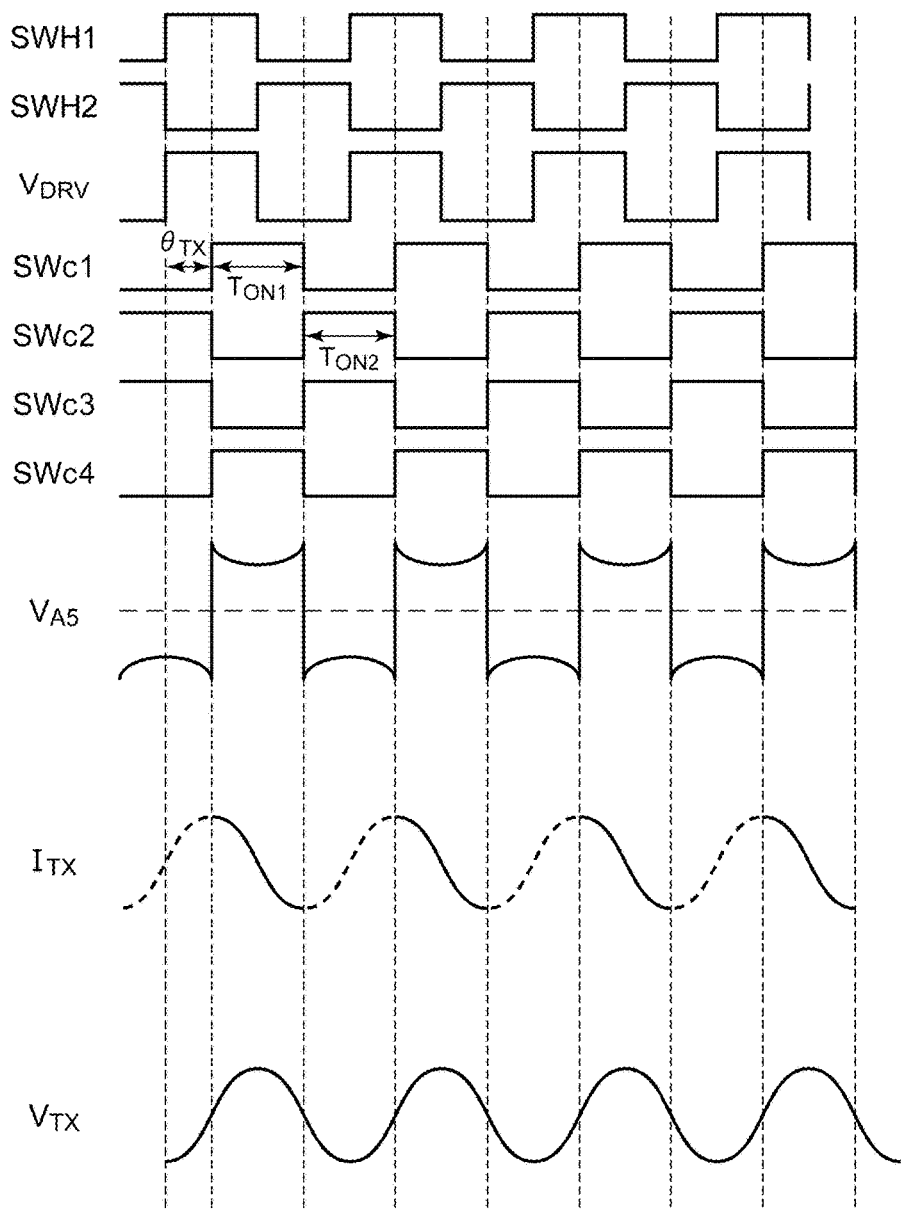
FIG. 23 is a waveform diagram showing the operation of the wireless power transmitting apparatus shown in FIG. 22.

FIG. 23 is a waveform diagram showing the operation of the wireless power transmitting apparatus 6 shown in FIG. 22. FIG. 23 shows, in the following order beginning from the top, the voltage at the first high-side switch SWH1, the voltage at the first low-side switch SWL1, the driving voltage $V_{DRV}$, the voltage at the first switch SWc1, the voltage at the second switch SWc2, the voltage at the third switch SWc3, the voltage at the fourth switch SWc4, the correction voltage $V_A$ generated at the first terminal 81, the resonance current $I_{TX}$ that flows through the transmission antenna 20, and the resonance voltage $V_{TX}$ that develops across the transmission coil $L_{TX}$ and the resonance capacitor $C_{TX}$. In the waveform diagram for each switch, the high level represents the on state, and the low level represents the off state. It should be noted that FIG. 23 shows the waveforms of the resonance current $I_{TX}$ and the resonance voltage $V_{TX}$ obtained after a sufficient time has elapsed after the automatic tuning assist circuit 80 starts to operate.

As shown in FIG. 23, by switching on and off the first high-side switch SWH1 and the first low-side switch SWL1 in a complementary manner, such an arrangement is capable of generating the driving voltage $V_{DRV}$ having a rectangular waveform. The driving voltage $V_{DRV}$ thus generated is applied across the transmission antenna 20 and the automatic tuning assist circuit 80. The first control unit 40 is configured to drive a first pair P1 comprising the first switch SWc1 and the fourth switch SWc4 with the same frequency as that of the driving voltage $V_{DRV}$, and with a phase that is delayed by $\theta_{TX}$ (=90 degrees) with respect to the driving voltage $V_{DRV}$. Furthermore, the first control unit 40 is configured to drive a second pair P2 comprising the second switch SWc2 and the third switch SWc3 in a complementary manner with respect to the first pair P1, i.e., with a phase that is shifted by 180 degrees with respect to that of the first pair P1.

During the on time $T_{ON1}$ of the first pair P1, the resonance current $I_{TX}$ flows through a path including the first switch SWc1, the first auxiliary capacitor $C_{A5}$, and the fourth switch SWc4. During the on time $T_{ON2}$ of the second pair P2, the resonance current $I_{TX}$ flows through a path including the third switch SWc3, the first auxiliary capacitor $C_{A5}$, and the second switch SWc2.

That is to say, the first auxiliary capacitor $C_{A5}$ is charged and discharged by means of the resonance current $I_{TX}$. As a result, the capacitor voltage $V_{CA5}$ develops at the first auxiliary capacitor $C_{A5}$.

The automatic tuning assist circuit 80 is configured to apply a correction voltage $V_A$ to the second terminal 22 of the transmission antenna 20. During the on time $T_{ON1}$ of the first pair P1, the correction voltage $V_A$ is set to a first polarity. During the on time $T_{ON2}$ of the second pair P2, the correction voltage $V_A$ is set to a second polarity. The automatic tuning assist circuit 80 can be regarded as a correction power supply configured to apply the correction voltage $V_A$ to the transmission antenna 20. That is to say, it can be clearly understood that the wireless power transmitting apparatus 6 can be represented by the same equivalent circuit as that shown in FIG. 5, and is configured to operate according to the same operation mechanism.

That is to say, in a case in which the automatic tuning assist circuit 80 operates, the correction voltage $V_A$ is applied to the transmission antenna 20 with a phase that is delayed by $\theta_{TX}$=90 degrees with respect to the driving voltage $V_{DRV}$. As a result, phase matching is obtained between the resonance current $I_{TX}$ and the driving voltage $V_{DRV}$, thereby providing a quasi-resonant state. In this state, the resonance current $I_{TX}$ has a greater amplitude than that in the non-resonant state. This is as shown in the phasor diagrams in FIGS. 7 and 9.

The operation of the automatic tuning assist circuit 80 according to the second embodiment is the same as described in the first embodiment with reference to FIG. 8. Thus, such an arrangement is capable of automatically generating the correction voltage $V_A$ which provides a quasi-resonant state.

The above is the operation of the wireless power transmitting apparatus 6.

As described above, without adjusting the resonance frequency $f_c$ of the transmission antenna 20, the wireless power transmitting apparatus 6 is capable of automatically tuning the circuit state so as to provide the quasi-resonant state. In the wireless power transmission, the resonance frequency changes over time according to the position relation between the wireless power transmitting apparatus and the wireless power receiving apparatus. The wireless power transmitting apparatus 6 is capable of following the change in the resonance frequency with high speed, thereby providing high-efficiency electric power transmission.

Furthermore, in a case in which a large amount of electric power is transmitted by means of wireless power transmission, a very high voltage develops between both ends of the resonance capacitor $C_{TX}$, which limits the use of a variable capacitor. With the wireless power transmitting apparatus 6, there is no need to adjust the capacitance of the resonance capacitor $C_{TX}$. Thus, such an arrangement does not require such a variable capacitor or the like, which is another advantage.

Description has been made above regarding an arrangement in which the first pair comprising the first switch SWc1 and the fourth switch SWc4 is switched on and off with a phase that is delayed by $\theta_{TX}$ (=90 degrees) with respect to the phase of the switching of the first high-side switch SWH1 (driving voltage $V_{DRV}$). However, the phase difference $\theta_{TX}$ between the first pair and the first high-side switch SWH1 is not restricted to 90 degrees. Also, an arrangement may be made in which the phase difference $\theta_{TX}$ between the first pair and the first high-side switch SWH1 is set to 270 degrees (−90 degrees). In this case, the capacitor voltage $V_{CA1}$ is automatically adjusted such that the polarity reverses. In a case in which the first switch SWc1 through the fourth switch SWc4 are each configured as a unidirectional switch, there is a need to switch on and off the first switch SWc1 through the fourth switch SWc4 with a phase such that no current flows through each of the inversely conducting elements. Specifically, in a case in which $f_c < f_{TX}$, the phase difference $\theta_{TX}$ is preferably set to 90 degrees. Conversely, in a case in which $f_c > f_{TX}$, the phase difference $\theta_{TX}$ is preferably set to 270 degrees.

Also, the phase difference $\theta_{TX}$ may be moved away from 90 degrees or 270 degrees, as described in the first embodiment.

Next, description will be made regarding modifications of the wireless power transmitting apparatus 6. Each modification may be combined with any one of the other modifications, which is encompassed within the scope of the present invention.

Description has been made above regarding an arrangement in which the first control unit 40 drives multiple switches included in the automatic tuning assist circuit 80 with the same frequency $f_{TX}$ as that of the driving voltage $V_{DRV}$. However, the present invention is not restricted to such an arrangement. Also, the first control unit 40 may be configured to switch on and off the aforementioned switches with a frequency obtained by multiplying or dividing the frequency of the driving voltage $V_{DRV}$ by an odd number. Such an arrangement also provides a quasi-resonant state.

Figure 24:
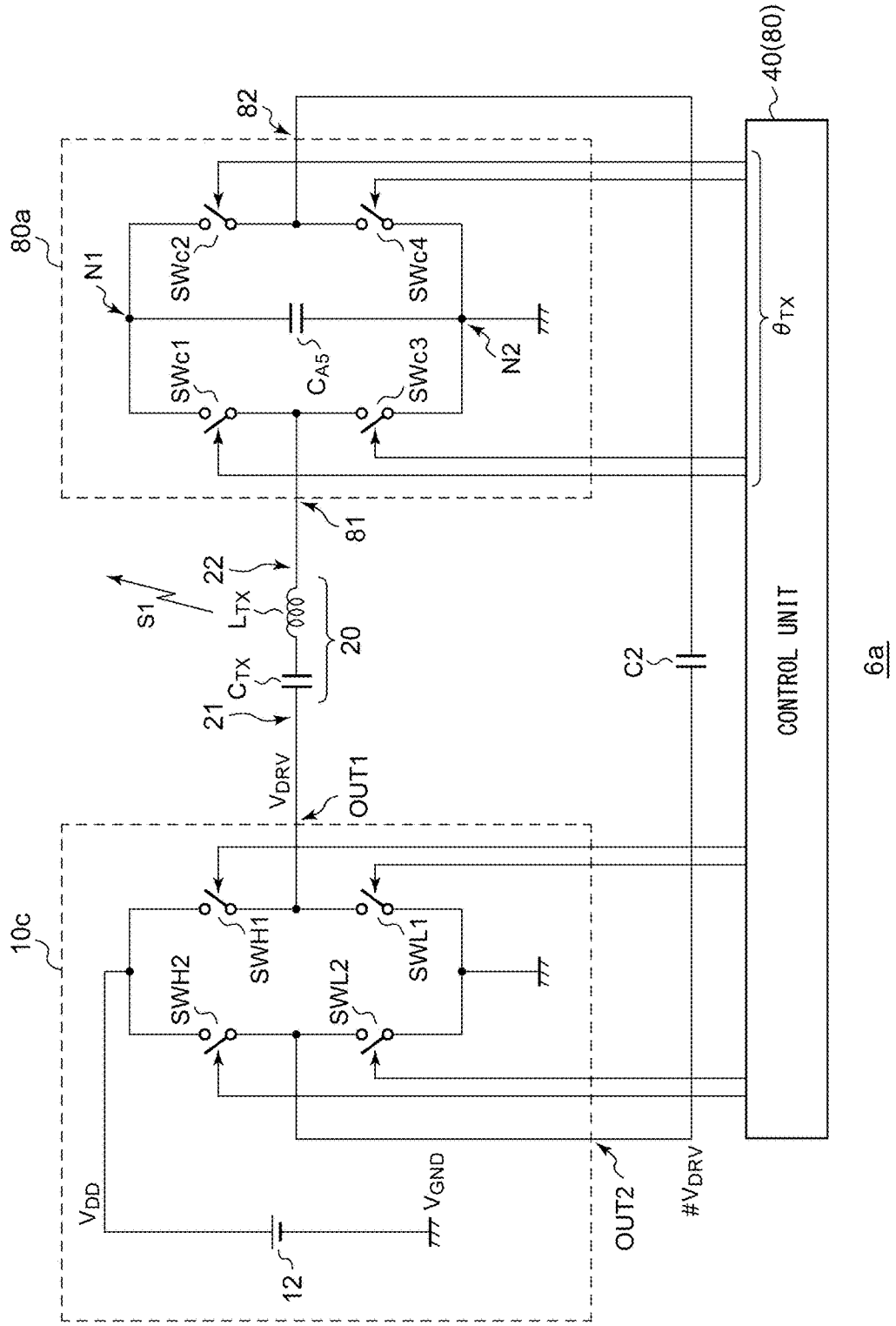
FIG. 24 is a circuit diagram showing the configuration of a wireless power transmitting apparatus according to a first modification.

FIG. 24 is a circuit diagram showing a configuration of a wireless power transmitting apparatus 6a according to a first modification. A power supply 10c shown in FIG. 24 is configured as an H-bridge circuit. A transmission antenna 20 and an automatic tuning assist circuit 80a are arranged in series between a first output terminal OUT1 and a second output terminal OUT2 of a power supply 10c. Furthermore, a capacitor C2 configured to block DC current is arranged in series with the transmission antenna 20 and the automatic tuning assist circuit 80a. With the automatic tuning assist circuit 80a, one end (N2) of a first auxiliary capacitor $C_{A5}$ is grounded.

With the wireless power transmitting apparatus 6a shown in FIG. 24, such an arrangement provides the same advantages as those provided by the wireless power transmitting apparatuses described above.

Figure 25A:
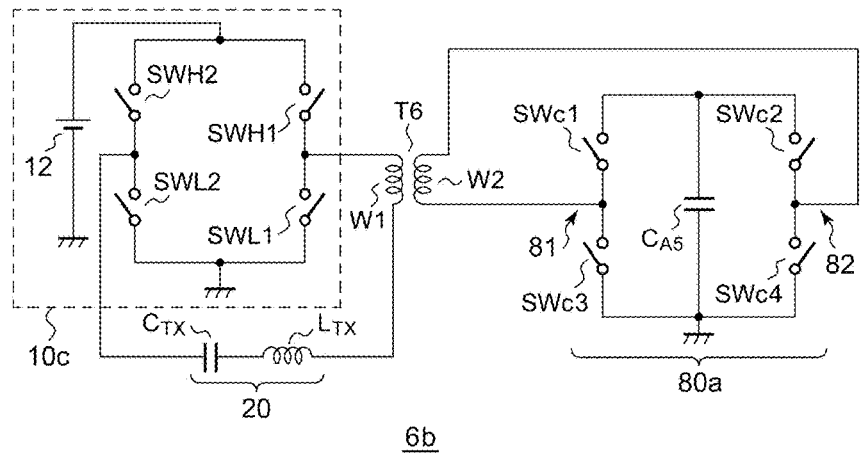
FIGS. 25A through 25C are circuit diagrams showing the configurations of wireless power transmitting apparatuses according to a second modification through a fourth modification, respectively.
Figure 25B:
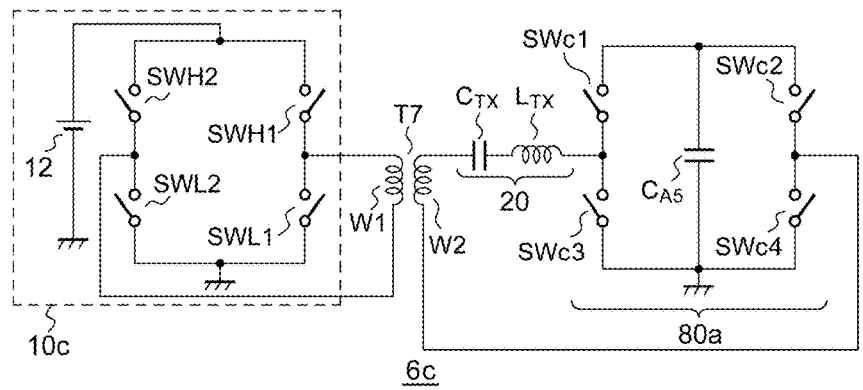
Figure 25C:
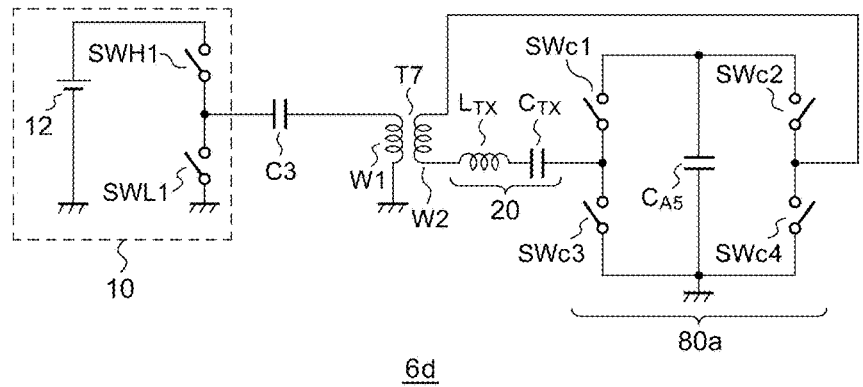

As described in the first embodiment, the power supply, the automatic tuning assist circuit, or otherwise both of them, may be coupled with the transmission antenna 20 via a transformer. FIGS. 25A through 25C are circuit diagrams respectively showing the configurations of wireless power transmitting apparatuses 6b through 6d according to second through fourth modifications. The first control unit 40 is not shown.

With the wireless power transmitting apparatus 6b shown in FIG. 25A, the automatic tuning assist circuit 80a is coupled in series with the transmission antenna 20 via a sixth transformer T6. Specifically, the sixth transformer T6 is configured to have a primary winding W1 connected in series with the transmission antenna 20, and to have a secondary winding W2 connected between the first terminal 61 and the second terminal 62 of the automatic tuning assist circuit 80a. The power supply 10c is configured to apply a driving voltage across a series circuit that comprises the transmission antenna 20 and the primary winding W1 of the sixth transformer T6.

With a wireless power transmitting apparatus 6c shown in FIG. 25B, the power supply 10c is coupled with the transmission antenna 20 and the automatic tuning assist circuit 80a via a seventh transformer T7. The power supply 10c is configured to apply a driving voltage across the primary winding W1 of the seventh transformer T7. The transmission antenna 20 and the automatic tuning assist circuit 80a are arranged in series with the secondary winding W2.

With a wireless power transmitting apparatus 6d shown in FIG. 25C, the power supply 10 having a half-bridge configuration is coupled with the transmission antenna 20 and the automatic tuning assist circuit 80a via the seventh transformer T7. A capacitor C3 configured to block DC current is arranged between the output terminal of the power supply 10 and the primary winding W1 of the seventh transformer T7.

Also, the modifications shown in FIGS. 25A through 25C may be combined. That is to say, both the power supply and the automatic tuning assist circuit may be coupled with the transmission antenna via a transformer.

Such modifications also provide the same advantages provided by the wireless power transmitting apparatuses described above.

[Wireless Power Receiving Apparatus]

The automatic tuning assist circuit according to the second embodiment described above may be employed in a wireless power receiving apparatus. Description will be made below regarding such a wireless power receiving apparatus.

Figure 26:
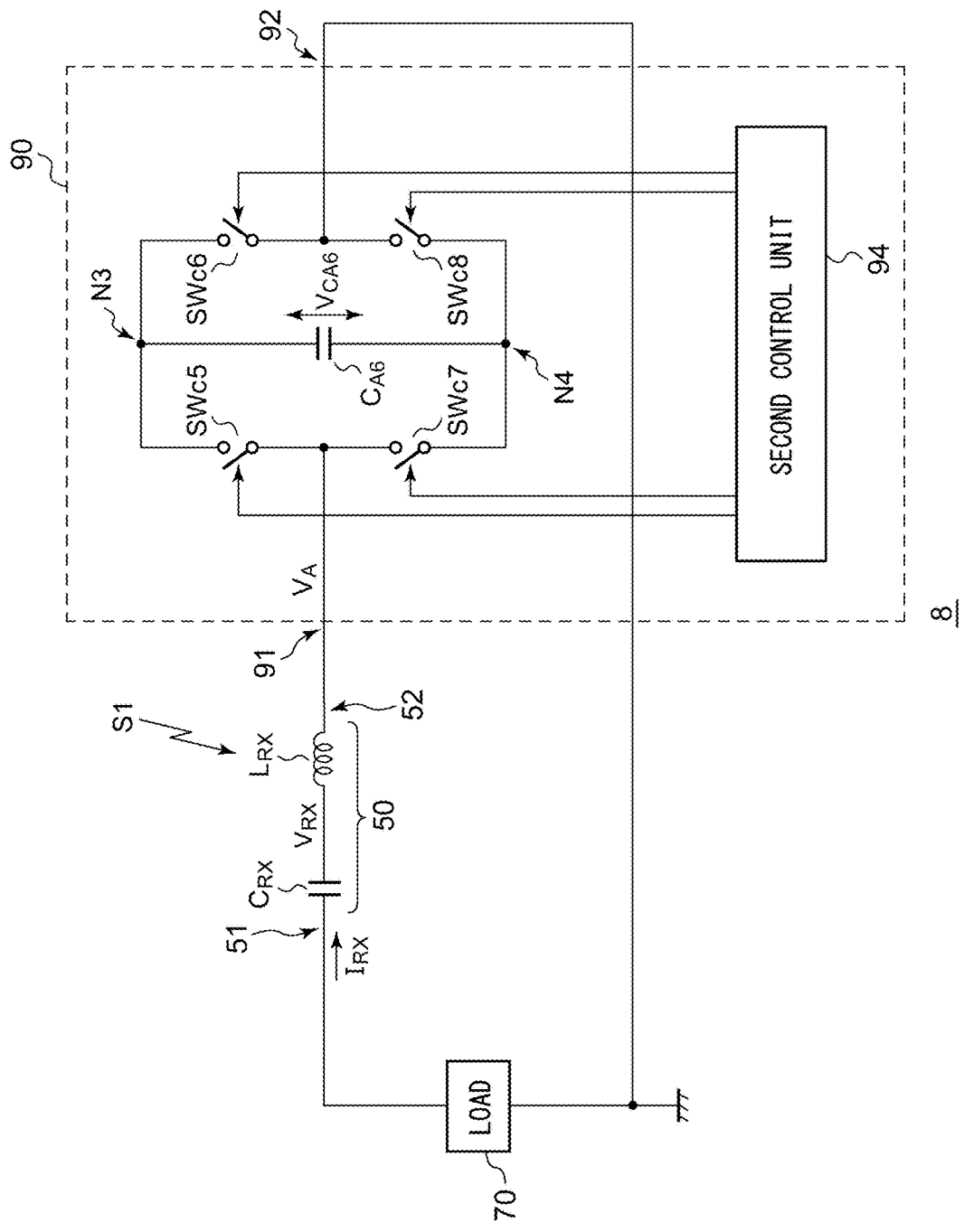
FIG. 26 is a circuit diagram showing a configuration of a wireless power receiving apparatus according to the second embodiment.

FIG. 26 is a circuit diagram showing a wireless power receiving apparatus 8 according to the second embodiment. The wireless power receiving apparatus 8 is configured to receive the electric power signal S1 transmitted from the aforementioned wireless power transmitting apparatus or otherwise a wireless power transmitting apparatus having an entirely different configuration. The electric power signal S1 is configured using the near-field components (electric field, magnetic field, or electromagnetic field) of electromagnetic waves that have not yet become radio waves.

The wireless power receiving apparatus 8 includes a reception antenna 50, an automatic tuning assist circuit 90, and a load 70 to be supplied with electric power. The load 70 may include an unshown rectifier circuit, detector circuit, or the like, as a built-in component.

The reception antenna 50 includes a reception coil $L_{RX}$ and a resonance capacitor $C_{RX}$ arranged in series between a first terminal 51 and a second terminal 52.

The automatic tuning assist circuit 90 has the same configuration as that of the automatic tuning assist circuit 80 shown in FIG. 22. Specifically, the automatic tuning assist circuit 90 includes a first terminal 91, a fifth switch SWc5 through an eighth switch SWc8, and a second auxiliary capacitor $C_{A6}$.

The fifth switch SWc5 and the sixth switch SWc6 are arranged in series between the first terminal 91 and the second terminal 92. The seventh switch SWc7 and the eighth switch SWc8 are sequentially arranged in series between the first terminal 91 and the second terminal 92. Furthermore, the seventh switch SWc7 and the eighth switch SWc8 are arranged in parallel with the fifth switch SWc5 and the sixth switch SWc6. The second auxiliary capacitor $C_{A6}$ is arranged between a connection node N3 that connects the fifth switch SWc5 and the sixth switch SWc6 and a connection node N4 that connects the seventh switch SWc7 and the eighth switch SWc8. The second auxiliary capacitor $C_{A6}$ is preferably configured to have a sufficiently great capacitance as compared with the resonance capacitance $C_{RX}$.

A second control unit 94 is configured to switch on and off the fifth switch SWc5 through the eighth switch SWc8 with the same frequency as that of the electric power signal S1, and with a phase difference $\theta_{RX}$ with respect to the driving voltage ($V_{DRV}$) which is applied to the transmitter-side antenna. For example, the phase difference $\theta_{RX}$ is preferably set to 180 degrees or otherwise 0 degrees.

The automatic tuning assist circuit 90 is coupled in series with the reception antenna 50. Furthermore, the load 70 to be supplied with electric power is directly connected with the reception antenna 50 and the automatic tuning assist circuit 90.

The above is the configuration of the wireless power receiving apparatus 8. Next, description will be made regarding the operation thereof. The wireless power receiving apparatus 8 can be represented by the same equivalent circuit diagram as that which represents the wireless power receiving apparatus 4 shown in FIG. 15. As with the automatic tuning assist circuit 80 of the wireless power transmitting apparatus 6, the automatic tuning assist circuit 90 can be regarded as a correction power supply configured to apply a correction voltage $V_A$ to the reception antenna 50.

Figure 27:
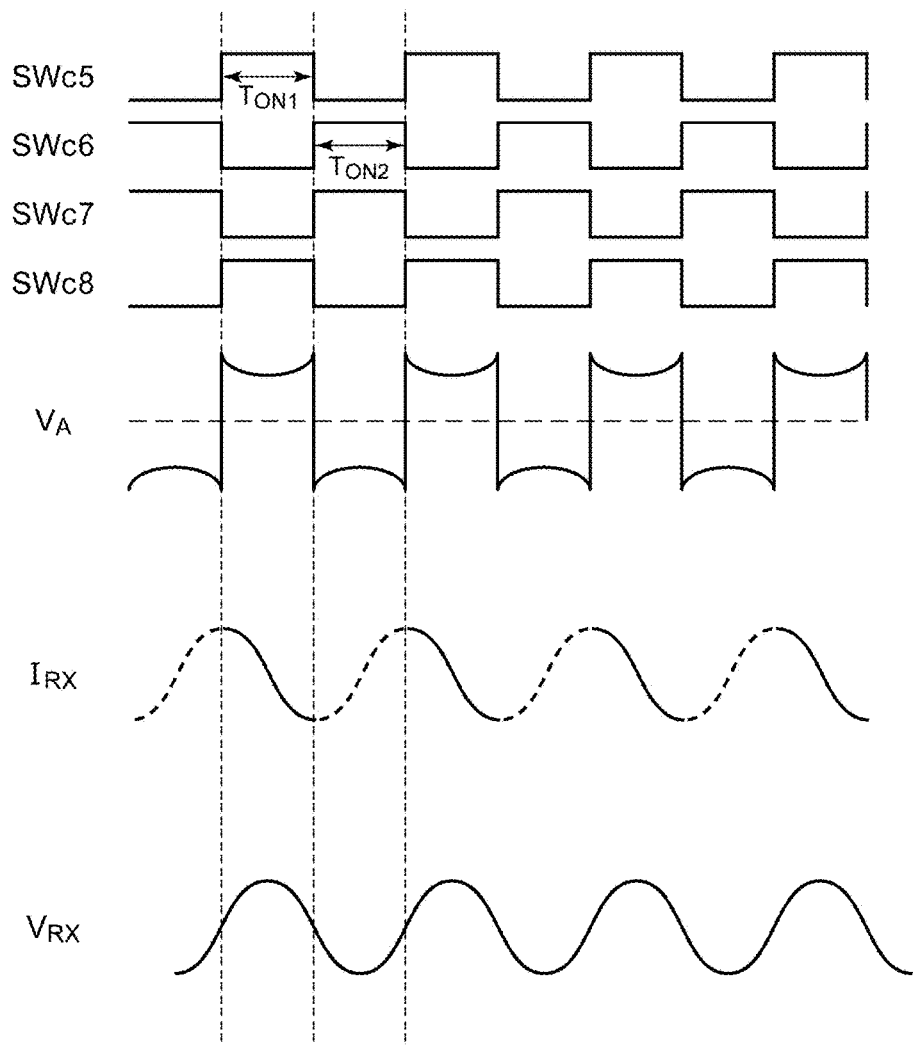
FIG. 27 is a waveform diagram showing the operation of the wireless power receiving apparatus shown in FIG. 26.

FIG. 27 is a waveform diagram showing the operation of the wireless power receiving apparatus 8 shown in FIG. 26. FIG. 27 shows the voltages applied to the fifth switch SWc5 through the eighth switch SWc8, the correction voltage $V_A$, the resonance current $I_{RX}$ that flows through the reception antenna 50, and the resonance voltage $V_{RX}$ that develops across the reception coil $L_{RX}$ and the resonance capacitor $C_{RX}$. In the waveform diagrams showing the voltages applied to the respective switches, the high-level state represents the on state, and the low-level state represents the off state.

A first pair comprising the fifth switch SWc5 and the eighth switch SWc8 is switched on and off with a phase $\theta_{RX}$ which is shifted by 180 degrees or otherwise 0 degrees with respect to the driving voltage $V_{DRV}$ of the wireless power transmitting apparatus side. A second pair comprising the sixth switch SWc6 and the seventh switch SWc7 is switched on and off in a complementary manner with respect to the first pair. During the on time $T_{ON1}$ of the first pair, the resonance current $I_{RX}$ flows through a path comprising the fifth switch SWc5, the second auxiliary capacitor $C_{A6}$, and the eighth switch SWc8. During the on time $T_{ON2}$ of the second pair, the resonance current $I_{RX}$ flows through a path comprising the sixth switch SWc6, the second auxiliary capacitor $C_{A6}$, and the seventh switch SWc7.

The second auxiliary capacitor $C_{A6}$ is charged and discharged by means of the resonance current $I_{RX}$. As a result, a capacitor voltage $V_{CA6}$ develops at the capacitor $C_{A6}$. With such an arrangement, the correction voltage $V_A$ that corresponds to the capacitor voltage $V_{CA6}$ is applied to the reception antenna 50. Thus, such an arrangement allows the resonance current $I_A$ to have a phase that matches the phase of the driving voltage $V_{DRV}$ that is used in the transmitter side, thereby providing a quasi-resonant state.

In order to provide a quasi-resonant state, there is a need to switch on and off the fifth switch SWc5 and the eighth switch SWc8 with a suitable frequency $f_{TX}$ and with a suitable phase $\theta_{RX}$. In order to meet this requirement, the wireless power transmitting apparatus may be configured to transmit the data which represents the frequency $f_{TX}$ and the phase $\theta_{RX}$ to the wireless power receiving apparatus 8. Also, the wireless power receiving apparatus 8 may be configured to sweep the phase $\theta_{RX}$ so as to detect the optimum phase $\theta_{RX}$.

The above is the operation of the wireless power receiving apparatus 8.

As described above, with the wireless power receiving apparatus 8 shown in FIG. 26, such an arrangement automatically provides a resonant state without a need to adjust the capacitance of the resonance capacitor $C_{RX}$.

Next, description will be made regarding modifications of the wireless power receiving apparatus 8.

Description has been made above regarding an arrangement in which the second control unit 64 drives the multiple switches, which are components of the automatic tuning assist circuit 30, with the same frequency as that of the electric power signal S1. However, the present invention is not restricted to such an arrangement. Also, the second control unit 64 may be configured to switch on and off the aforementioned switches with a frequency obtained by multiplying or dividing the frequency of the electric power signal S1 by an odd number. Such an arrangement also provides a quasi-resonant state.

Description has been made with reference to FIG. 26 regarding an arrangement in which one terminal of the load 70 is grounded, and the ground potential is used as the reference potential. Also, instead of such an arrangement in which one terminal of the load 70 is grounded, one terminal of the second auxiliary capacitor $C_{A6}$ of the automatic tuning assist circuit 90, i.e., either the connection node N3 or N4, may be grounded.

Figure 28A:
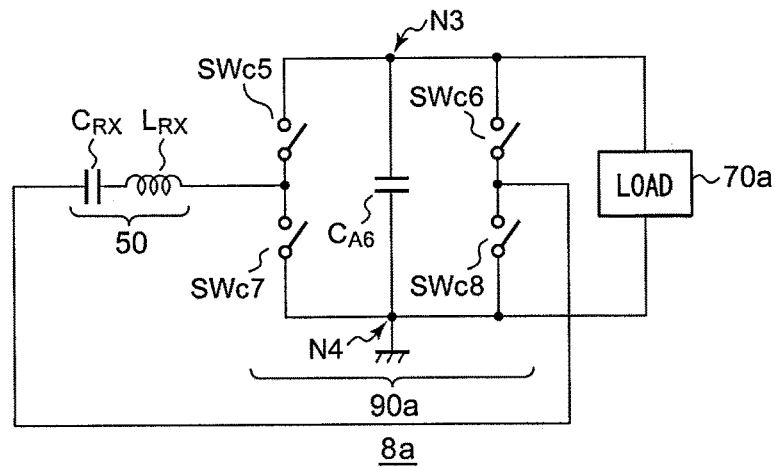
FIGS. 28A and 28B are circuit diagrams showing the configurations of wireless power receiving apparatuses according to a second modification and a third modification.
Figure 28B:
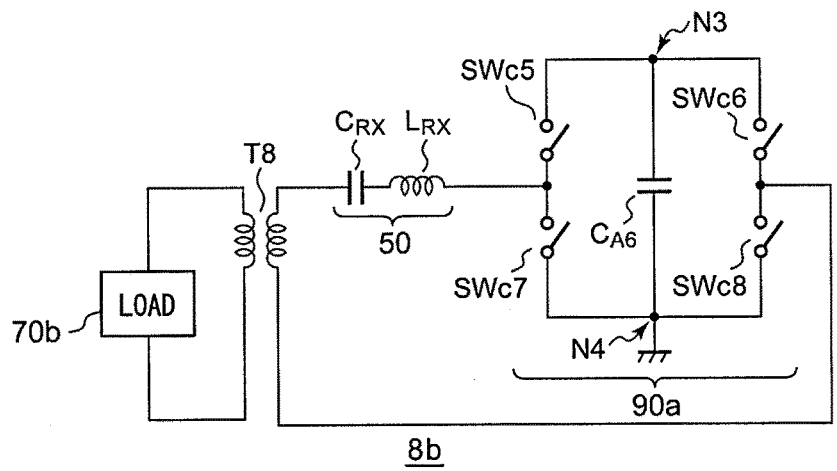

FIGS. 28A and 28B are circuit diagrams showing the configurations of wireless power receiving apparatuses according to a second modification and a third modification.

Description has been made with reference to FIG. 26 regarding an arrangement in which the load 70 is connected in series with the reception antenna 50. Also, the load 70 may be arranged at a different position.

With a wireless power receiving apparatus 8a according to a first modification shown in FIG. 28A, the connection node N4 of the automatic tuning assist circuit 90a is grounded. A load 70a is arranged in parallel with the second auxiliary capacitor $C_{A6}$. That is to say, the load 70a is supplied with a capacitor voltage $V_{CA6}$ that develops at the second auxiliary capacitor $C_{A6}$.

With a wireless power receiving apparatus 8b according to a second modification shown in FIG. 28B, a load 70b is coupled via an eighth transformer T8 with a series circuit comprising the reception antenna 50 and the automatic tuning assist circuit 90a.

Figure 28C:
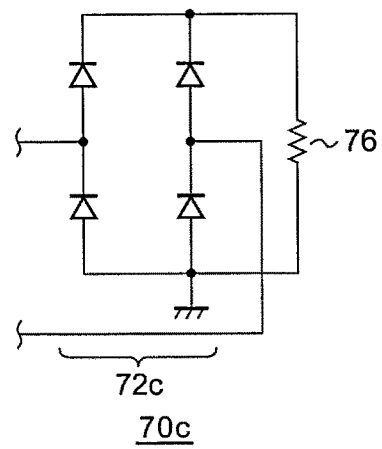
FIGS. 28C and 28D are circuit diagrams each showing an example configuration of a load.
Figure 28D:
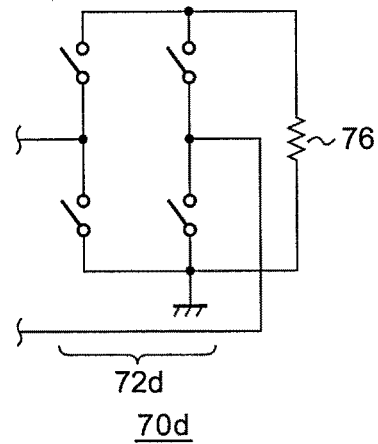

FIGS. 28C and 28D are circuit diagrams each showing an example configuration of such a load. A load 70c shown in FIG. 28C includes a diode rectifier circuit 72c and a load circuit 76. A load 70d shown in FIG. 28D includes a synchronous detector circuit 72d and the load circuit 76. Such a load circuit may further include a switching regulator 74 as shown in FIG. 20.

Figure 29:
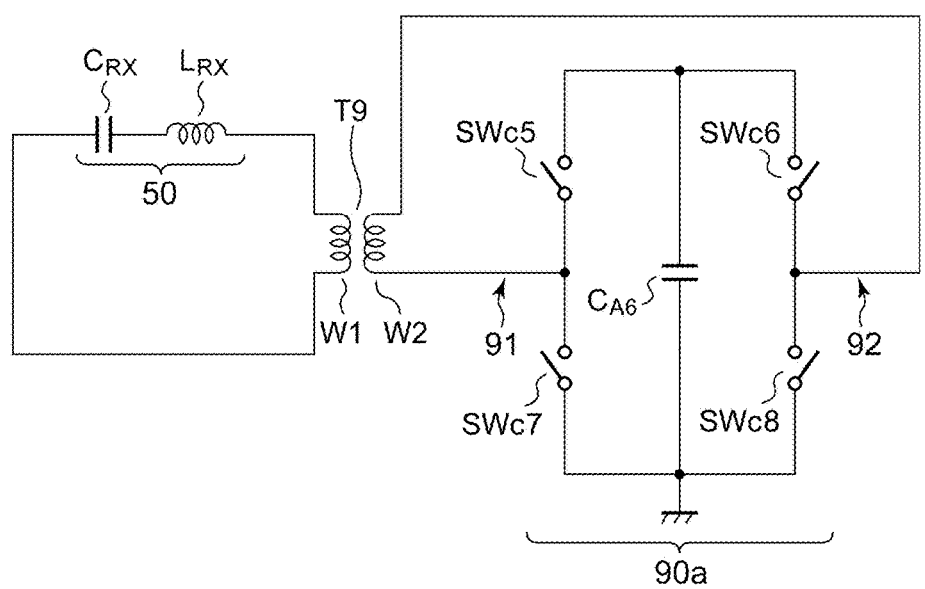
FIG. 29 is a circuit diagram showing a configuration of a wireless power receiving apparatus according to a third modification.

Such an automatic tuning assist circuit 90 may be coupled in series with the reception antenna 50 via a transformer. FIG. 29 is a circuit diagram showing a configuration of a wireless power receiving apparatus 8c according to a third modification. The automatic tuning assist circuit 90a is coupled in series with the reception antenna 50 via a ninth transformer T9. A load may be arranged in series with the reception antenna 50 and the primary winding W1. Also, such a load may be arranged in parallel with the second auxiliary capacitor $C_{A6}$.

Such modifications also provide the same advantages as those provided by the wireless power receiving apparatus 8 shown in FIG. 26.

In a case in which the load is connected in series with the reception antenna 50 as shown in FIG. 26, and in a case in which the load has a low impedance, such an arrangement has an advantage of a certain level of acquisition of electric power even without the adjustment by means of the automatic tuning assist circuit 90. However, such an arrangement has a disadvantage of a reduction of the Q-value of the reception antenna 50 due to the resistance component of the load. Thus, it is difficult for such an arrangement to acquire a large amount of electric power.

Conversely, in a case in which electric power is acquired from the automatic tuning assist circuit 90a as shown in FIG. 28A, the Q-value of the reception antenna 50 is not reduced due to the load 70. Thus, such an arrangement is capable of acquiring a large amount of electric power even in a case in which the load 70a has a high impedance. However, in a case in which the load 70a has a very low impedance, such an arrangement has a problem of a reduction in the efficiency of the operation of the automatic tuning assist circuit 60.

Thus, the position of the load in the circuit is preferably determined giving consideration to the electric power to be transmitted, the impedance of the load, and so forth.

The fifth switch SWc5 through the eighth switch SWc8 may each be configured as a uni-directional switch or otherwise a bi-directional switch. As described above, in a case in which these switches are each configured as a uni-directional switch, there is a need to pay attention to their switching phases.

[Wireless Power Transmission System]

By combining the wireless power transmitting apparatus 6 and the wireless power receiving apparatus 8 described in the second embodiment, such an arrangement provides a wireless power transmission system.

Description has been made regarding an arrangement in which an automatic tuning assist circuit is mounted on each of the wireless power transmitting apparatus 6 and the wireless power receiving apparatus 8. However, the present invention is not restricted to such an arrangement.

Also, an arrangement may be made in which such an automatic tuning assist circuit is provided to only the wireless power transmitting apparatus 6, and the wireless power receiving apparatus adjusts the resonance capacitor $C_{RX}$ in the same way as with conventional techniques. Conversely, an arrangement may be made in which such an automatic tuning assist circuit is provided to only the wireless power receiving apparatus 8, and the wireless power transmitting apparatus 6 adjusts the resonance capacitor $C_{TX}$ in the same way as with conventional techniques.

Also, an arrangement may be made in which such an automatic tuning assist circuit is provided to only the wireless power transmitting apparatus 6, and the wireless power receiving apparatus 8 has no adjustment mechanism. Alternatively, an arrangement may be made in which such an automatic tuning assist circuit is provided to only the wireless power receiving apparatus 8, and the wireless power transmitting apparatus 6 has no adjustment mechanism.

With such arrangements, tuning is performed by means of a single automatic tuning assist circuit so as to provide impedance matching between the power supply 10 and the load 70, thereby providing high-efficiency electric power transmission. It should be noted that, with such arrangements, the optimum value of the phase $\theta_{TX}$ ($\theta_{RX}$) of the switching of the automatic tuning assist circuit does not match the aforementioned values, i.e., 90 degrees or otherwise 270 degrees (180 degrees or otherwise 0 degrees).

Also, the wireless power transmitting apparatus 2 according to the first embodiment may be combined with the wireless power receiving apparatus 8 according to the second embodiment. Also, the wireless power receiving apparatus 4 according to the first embodiment may be combined with the wireless power transmitting apparatus 6 according to the second embodiment.

Description has been made regarding the present invention with reference to the second embodiment. The above-described embodiment has been described for exemplary purposes only, and is by no means intended to be interpreted restrictively. Rather, it can be readily conceived by those skilled in this art that various modifications may be made by making various combinations of the aforementioned components or processes, which are also encompassed in the technical scope of the present invention. Description will be made below regarding such modifications.

With the wireless power transmitting apparatus 6 including the automatic tuning assist circuit 80, in some cases, such an arrangement is capable of providing a quasi-resonant state even while omitting the resonance capacitor $C_{TX}$. In this case, such a resonance capacitor $C_{TX}$ may be omitted. In the same way, an arrangement may be made in which the wireless power receiving apparatus 8 including the automatic tuning assist circuit 90 does not include the resonance capacitor $C_{RX}$.

The wireless power transmitting apparatus 6 is configured to encrypt the electric power signal S1 by changing at least one of the frequency $f_{TX}$ and the phase of the driving voltage $V_{DRV}$ according to a predetermined rule (encryption code). In a case in which the wireless power receiving apparatus 8 knows the encryption code, the wireless power receiving apparatus 8 controls the switching frequency and phase of the automatic tuning assist circuit 90 based on the encryption code. As a result, even if the electric power signal S1 is encrypted, such an arrangement is capable of decrypting the electric power signal S1 and receiving the power supply. In a case in which the wireless power receiving apparatus does not know the encryption code, the wireless power receiving apparatus cannot appropriately control the switching operation of the automatic tuning assist circuit 90. Thus, such a wireless power receiving apparatus cannot receive electric power. With wireless power transmission, there is a problem of potential power theft by malicious users. However, by employing such an automatic tuning assist circuit, such a problem can be solved.

Also, in a case in which a single wireless power transmitting apparatus 6 supplies electric power to multiple wireless power receiving apparatuses 8, by employing such an automatic tuning assist circuit, such an arrangement is capable of controlling the amount of electric power to be supplied to each terminal.

The usage of the automatic tuning assist circuit 30 is not restricted to such wireless power transmission. Rather, the present invention is applicable to various kinds of applications which require tuning.

Description has been made regarding the present invention with reference to the embodiments. However, the above-described embodiments show only the mechanisms and applications of the present invention for exemplary purposes only, and are by no means intended to be interpreted restrictively. Rather, various modifications and various changes in the layout can be made without departing from the spirit and scope of the present invention defined in appended claims.

What is claimed is:

1. A wireless power transmitting apparatus configured to transmit an electric power signal comprising any one from among an electric field, a magnetic field and an electromagnetic field to a wireless power receiving apparatus/ the wireless power transmitting apparatus comprising:
   a transmission antenna comprising a transmission coil;
   an automatic tuning assist circuit coupled with the transmission antenna; and
   a power supply configured to apply an AC driving voltage across a series circuit that comprises the transmission antenna and the automatic tuning assist circuit,
   wherein the automatic tuning assist circuit comprises:
      a first terminal coupled to a first end of the transmission antenna;
      a second terminal;
      N (N represents an integer) auxiliary capacitors;
      a plurality of switches each of which is arranged between two terminals from among the first terminal, the second terminal, and the terminals of the N auxiliary capacitors; and
      a first control unit configured to switch on and off the plurality of switches in synchronization with the driving voltage, wherein the AC driving voltage is applied across a second end of the transmission antenna and the second terminal of the automatic tuning assist circuit.

2. The wireless power transmitting apparatus according to claim 1, wherein the first control unit is configured to switch on and off each of the plurality of switches with the same frequency as that of the driving voltage, or otherwise with a frequency obtained by multiplying or dividing the frequency of the driving voltage by an odd number.

3. The wireless power transmitting apparatus according to claim 1, wherein the automatic tuning assist circuit comprises:

a first switch and a first auxiliary capacitor arranged in series between the first terminal and the second terminal; and
a second switch arranged between the first terminal and the second terminal such that it is arranged in parallel with the first switch and the first auxiliary capacitor.

4. The wireless power transmitting apparatus according to claim 3, wherein the first control unit is configured to switch on and off the first switch and the second switch with the same frequency as that of the driving voltage, and with a given phase difference with respect to the driving voltage.

5. The wireless power transmitting apparatus according to claim 3, wherein the automatic tuning assist circuit further comprises a second auxiliary capacitor between the first terminal and the second terminal such that it is arranged in series with the second switch.

6. The wireless power transmitting apparatus according to claim 3, wherein the first switch and the second switch are each configured as a uni-directional switch,
   and wherein the first control unit is configured to switch on and off the first switch and the second switch with a phase controlled such that no current flows through each of their inversely conducting elements.

7. The wireless power transmitting apparatus according to claim 3, wherein the first switch and the second switch are each configured as a bi-directional switch.

8. The wireless power transmitting apparatus according to claim 1, wherein the power supply comprises:
   a DC power supply; and
   a first high-side switch and a first low-side switch sequentially arranged in series between an output terminal of the DC power supply and a fixed voltage terminal,
   and wherein the second end of the transmission antenna is coupled to a connection node that connects the first high-side switch and the first low-side switch, and the second terminal of the automatic tuning assist circuit is coupled to the fixed voltage terminal.

9. The wireless power transmitting apparatus according to claim 1, wherein the power supply comprises:
   a DC power supply;
   a first high-side switch and a first low-side switch sequentially arranged in series between an output terminal of the DC power supply and a fixed voltage terminal; and
   a second high-side switch and a second low-side switch sequentially arranged in series between the output terminal of the DC power supply and the fixed voltage terminal,
   wherein the second end of the transmission antenna is coupled to a connection node that connects the first high-side switch and the first low-side switch, and the second terminal of the automatic tuning assist circuit is coupled to a connection node that connects the second high-side switch and the second low-side switch.

10. The wireless power transmitting apparatus according to claim 1, wherein the transmission antenna comprises a resonance capacitor arranged in series with the transmission coil.

11. The wireless power transmitting apparatus according to claim 1, wherein the power supply is configured to apply an AC driving voltage via a transformer across a series circuit that comprises the transmission antenna and the automatic tuning assist circuit.

12. The wireless power supply system comprising:
    the wireless power transmitting apparatus according to claim 1; and a wireless power receiving apparatus configured to receive an electric power signal from the wireless power transmitting apparatus.

13. An automatic tuning assist circuit employed in a wireless power transmitting apparatus configured to transmit an electric power signal comprising any one from among an electric field, a magnetic field, and an electromagnetic field to a wireless power receiving apparatus via a transmission coil, and coupled with the transmission coil, the automatic tuning assist circuit comprising:
- a first terminal coupled to a first end of a transmission antenna including the transmission coil;
- a second terminal;
- at least one auxiliary capacitor;
- a plurality of switches arranged in order to charge and discharge the respective aforementioned at least one auxiliary capacitor using a resonance current that flows through the transmission coil; and
- a first control unit configured to switch on and off the plurality of switches so as to generate a capacitor voltage across the respective aforementioned at least one auxiliary capacitor, and to apply, to the transmission coil, a correction voltage that corresponds to the capacitor voltage that develops at the aforementioned at least one auxiliary capacitor, wherein an AC driving voltage from a power supply is applied across a second end of the transmission antenna and the second terminal of the automatic tuning assist circuit.

14. A wireless power transmitting apparatus configured to transmit an electric power signal comprising any one from among an electric field, a magnetic field, and an electromagnetic field to a wireless power receiving apparatus, the wireless power transmitting apparatus comprising:
- a transmission antenna comprising a transmission coil;
- the automatic tuning assist circuit according to claim 13, coupled with the transmission antenna; and
- a power supply configured to apply an AC driving voltage across a series circuit that comprises the transmission antenna and the automatic tuning assist circuit.

* * * * *